United States Patent
Okada

(10) Patent No.: US 12,514,590 B2
(45) Date of Patent: Jan. 6, 2026

(54) CARTRIDGE SYSTEM

(71) Applicant: OLYMPUS CORPORATION, Hachioji (JP)

(72) Inventor: Tsutomu Okada, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 458 days.

(21) Appl. No.: 17/894,264

(22) Filed: Aug. 24, 2022

(65) Prior Publication Data

US 2022/0401106 A1    Dec. 22, 2022

Related U.S. Application Data

(63) Continuation of application No. PCT/JP2021/007469, filed on Feb. 26, 2021.

(30) Foreign Application Priority Data

Feb. 26, 2020    (WO) .................. PCT/JP2020/007645

(51) Int. Cl.
*A61B 17/122*    (2006.01)
*A61B 17/128*    (2006.01)

(52) U.S. Cl.
CPC ...... *A61B 17/1222* (2013.01); *A61B 17/1285* (2013.01)

(58) Field of Classification Search
CPC . A61B 17/122; A61B 17/1222; A61B 17/128; A61B 17/1285
See application file for complete search history.

(56) References Cited

U.S. PATENT DOCUMENTS

| | | | | |
|---|---|---|---|---|
| 8,348,964 | B2* | 1/2013 | Kimura | A61B 17/1222 606/157 |
| 2005/0143767 | A1* | 6/2005 | Kimura | A61B 50/30 606/158 |
| 2006/0155308 | A1 | 7/2006 | Griego | |
| 2007/0112359 | A1* | 5/2007 | Kimura | A61B 17/1222 606/142 |
| 2011/0245855 | A1* | 10/2011 | Matsuoka | A61B 17/122 606/157 |
| 2017/0020531 | A1 | 1/2017 | Naveed et al. | |

(Continued)

FOREIGN PATENT DOCUMENTS

| | | |
|---|---|---|
| JP | 2008-526376 A | 7/2008 |
| JP | 2009-22776 A | 2/2009 |
| JP | 2011-45535 A | 3/2011 |

(Continued)

OTHER PUBLICATIONS

Apr. 20, 2021 International Search Report issued in International Patent Application No. PCT/JP2021/007469.

(Continued)

*Primary Examiner* — Todd J Scherbel
(74) *Attorney, Agent, or Firm* — Oliff PLC

(57) ABSTRACT

A cartridge system includes a clip unit including a clip having a plurality of arms; a case including an accommodation region in which the clip unit is accommodated; and a spacer that is accommodated in the accommodation region, wherein the spacer is configured to be separated from the clip unit when the clip unit is pulled to a proximal-end side of the cartridge system.

16 Claims, 27 Drawing Sheets

(56) References Cited

U.S. PATENT DOCUMENTS

2019/0046205 A1    2/2019  Ikeda et al.
2021/0353296 A1*  11/2021  Fujimoto ............. A61B 17/122

FOREIGN PATENT DOCUMENTS

| JP | 5045484 | * | 10/2012 |
| JP | 2017-148182 A | | 8/2017 |
| JP | 6284009 B2 | | 2/2018 |

OTHER PUBLICATIONS

Aug. 22, 2023 Office Action issued in Japanese Patent Application No. 2022-503760.

* cited by examiner

CARTRIDGE SYSTEM

CROSS REFERENCE TO RELATED APPLICATIONS

This application is a continuation application of PCT International Application No. PCT/JP2021/007469, filed Feb. 26, 2021, which claims priority to Japanese Application No. PCT/JP2020/007645 filed Feb. 26, 2020, and the contents thereof are incorporated herein by reference.

TECHNICAL FIELD

The present disclosure relates to a cartridge system accommodating a clip unit for an endoscope and a method for loading the clip unit for an endoscope.

BACKGROUND

In the endoscopic treatment, a clip unit that can ligate the resected portion after treatment for the hemostasis or the like is used. The clip unit includes a clip that clamps the resected portion and the like, and a pressing tube that accommodates the clip and locks the clip into a closed configuration. The clip unit is introduced to the treatment site by an introduction device insertable into a channel of the endoscope.

A cartridge is used when attaching the clip unit to the introduction device. For example, a cartridge may be configured to accommodate a clip unit including a clip with a self-expanding force. The clip having the self-expanding force is loaded into the introduction device together with the pressing tube when the clip is in a closed state.

However, in order to load the clip unit into the introduction device, when the clip having the self-expanding force was made to enter the closed state, there is a case in which the clip was locked in the closed state by the pressing tube.

In view of the above circumstances, a purpose of the present disclosure is to provide a cartridge system and a method for loading a clip unit such that a clip having a self-expanding force can be loaded into an introduction device while preventing the clip from being locked in a closed state by a holding tube.

SUMMARY

A cartridge system according to an aspect of the present disclosure includes a clip unit including a clip, a pressing tube, and a connection member; a case including an accommodation region formed to accommodate the clip unit and a sheath connection portion into which a sheath is insertable; and a regulating member that is accommodated in the accommodation region, wherein the clip includes a plurality of arms to be openable and closable and a connection portion inserted into the pressing tube and configured to connect the plurality of arms, the connection member can connect the connection portion and a force transmission portion inserted into the sheath, and the regulating member can move the accommodation region in a state of being in contact with the plurality of arms in a case in which the connection member is pulled toward a proximal-end side thereof.

A method of loading a clip unit including a clip, a pressing tube, and a connection member according to another aspect of the present disclosure includes: when loading the clip unit into a sheath by pulling the connection member connected with the clip that is inserted into the pressing tube, regulating a minimum approaching distance between the clip and the pressing tube; and releasing a regulation of the minimum approaching distance between the clip and the pressing tube after accommodating at least part of the pressing tube into the sheath.

DESCRIPTION OF EMBODIMENTS

A first embodiment of the present disclosure will be described with reference to FIG. 1 to FIG. 17.

A cartridge system 100 according to the present embodiment includes a clip unit 1 and a cartridge 5 configured to accommodate the clip unit 1. The cartridge system 100 is an assistance system for easily loading the clip unit 1 into a clip introduction device 200.

[Clip Introduction Device 200]

Figure 1:
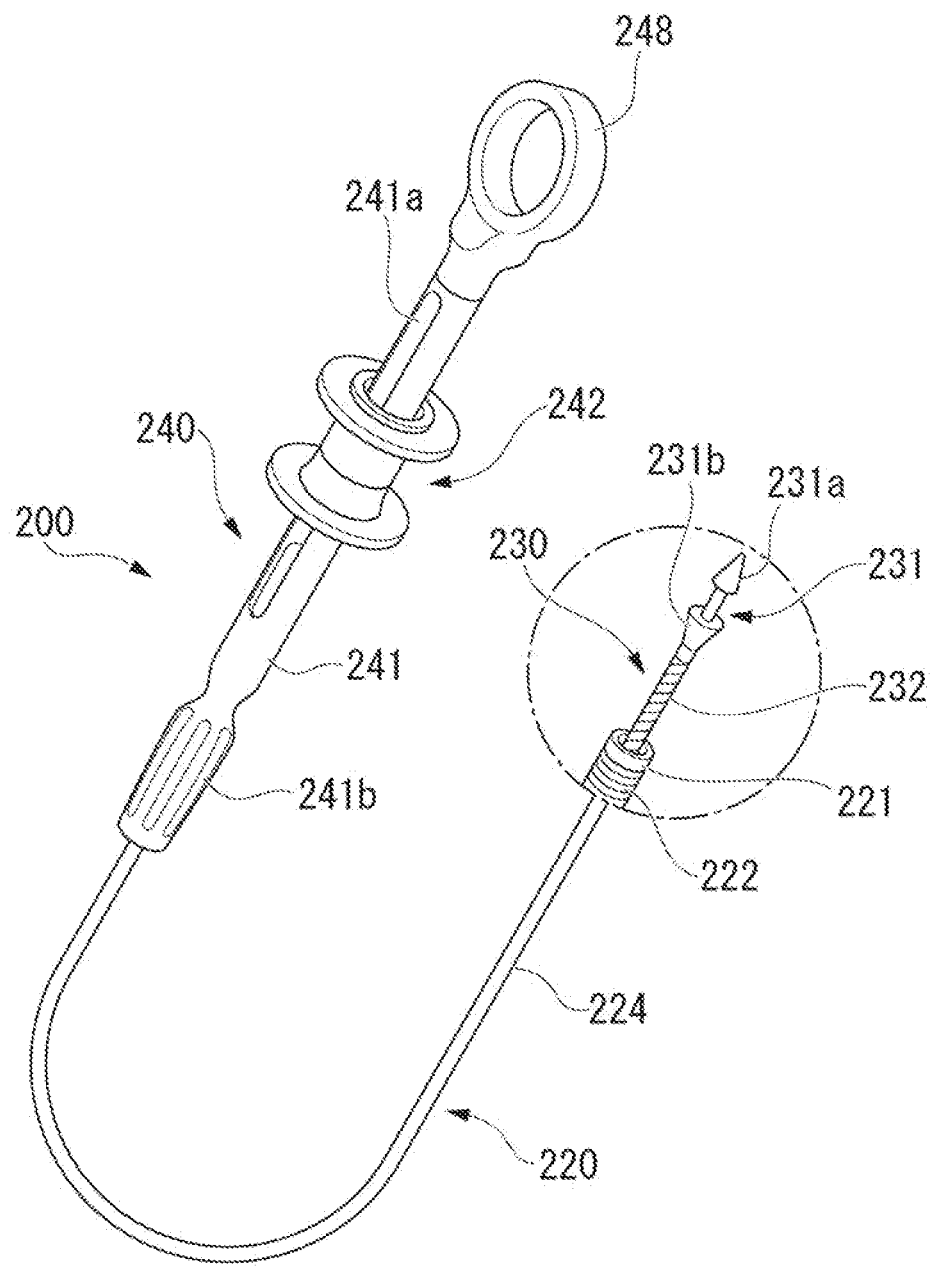
FIG. 1 is a perspective view showing a clip introduction device.

FIG. 1 is a perspective view showing the clip introducing device 200.

The clip introduction device 200 includes a sheath 220, an operation wire 230, and an operation portion 240. The clip introduction device 200 is inserted into, for example, a treatment device insertion channel of an endoscope and is used in combination with the endoscope. Therefore, the sheath 220 is formed sufficiently longer than the length of the treatment device insertion channel of the endoscope. The sheath 220 has flexibility and is bent in accordance with the bending of the insertion portion of the endoscope.

The sheath 220 includes a distal-end tip 221, a distal-end-side coil 222, and a hand-side coil 224, and the sheath 220 is formed in an elongated tubular shape as a whole. The distal-end-side coil 222 is arranged on the distal-end side of the sheath 220. The distal-end tip 221 is arranged at the distal-end portion of the distal-end-side coil 222.

As shown in FIG. 1, the operation wire (force transmission portion) 230 includes an arrowhead hook portion (connection portion) 231 that connects to the clip unit 1 and a wire 232 for operating the arrowhead hook portion 231.

The arrowhead hook portion 231 includes an engaging portion 231a formed in a substantially conical shape to engage with the clip unit 1 and a wire connecting portion 231b provided at the proximal end of the engaging portion 231a. The arrowhead hook portion 231 is formed of a metal material such as a stainless steel material or the like.

The wire 232 is inserted into the sheath 220 so as to be able to advance and retreat with respect to the sheath 220. The distal-end portion of the wire 232 is fixed to the proximal end of the wire connecting portion 231b by welding, for example.

As shown in FIG. 1, the operation portion 240 includes an operation portion main body 241, a slider 242, and a thumb ring 248. The operation portion main body 241 is injection-molded by a resin material, for example. The operation portion main body 241 includes a slit portion 241a and a rotary grip 241b on the distal-end side. The slit portion 241a supports the slider 242 to be advanceable and retractable.

The slider 242 is attached so as to be advanceable and retractable in the longitudinal axis direction of the operation portion main body 241, and the proximal end of the wire 232 is attached to the slider 242. When the slider 242 advances and retreats along the operation portion main body 241, the wire 232 advances and retreats with respect to the sheath 220, and the arrowhead hook portion 231 advances and retreats.

The thumb ring 248 is attached to the proximal end of the operation portion main body 241 to be rotatable around the longitudinal axis of the operation portion main body 241.

[Clip Unit 1]

Figure 2:
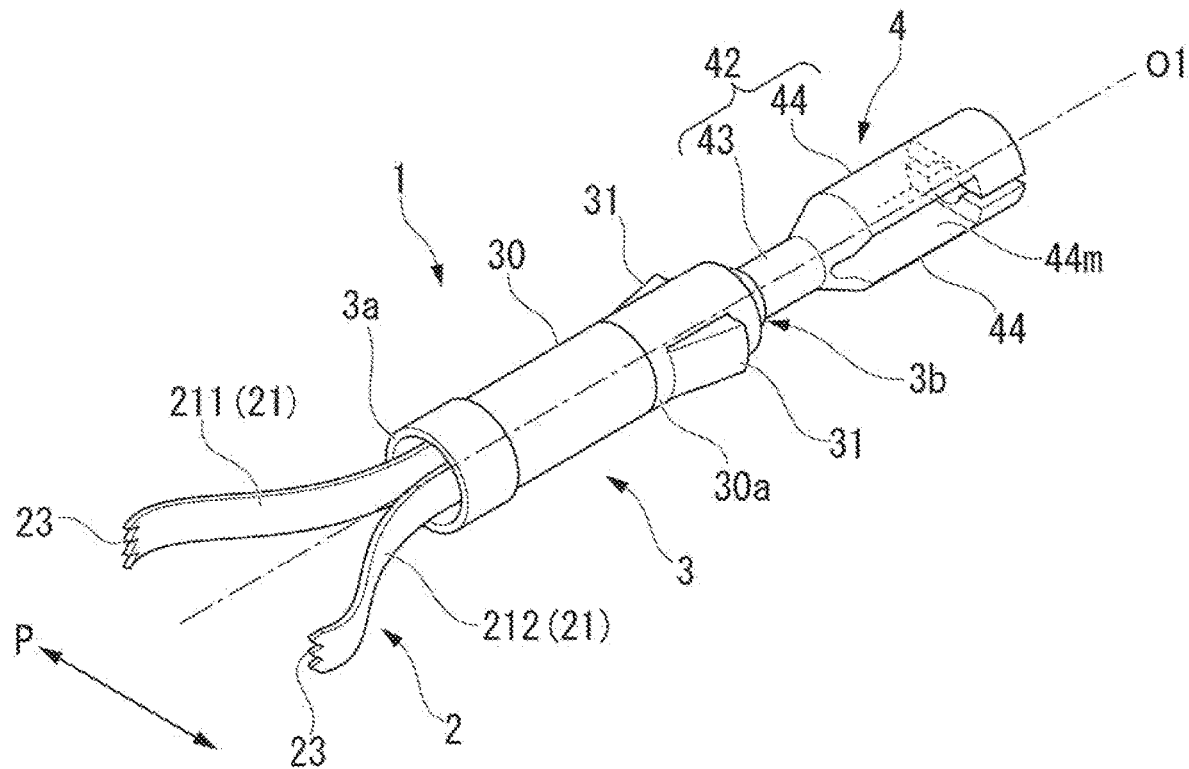
FIG. 2 is a perspective view showing a clip unit of a cartridge system according to an exemplary embodiment of the present disclosure.
Figure 3:
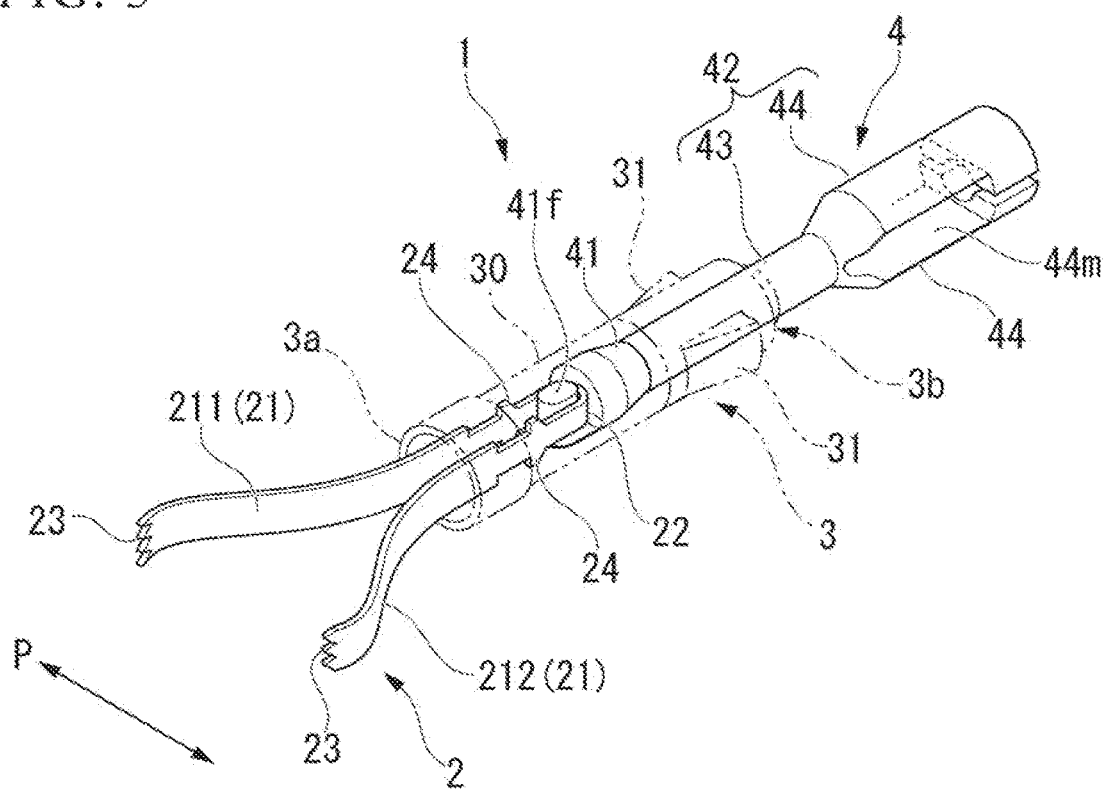
FIG. 3 is a perspective view showing the clip unit by making a pressing tube to be transparent.

FIG. 2 is a perspective view showing the clip unit 1 of the cartridge system 100 according to the present embodiment. FIG. 3 is a perspective view showing the clip unit 1 in which the pressing tube 3 is transparently displayed. The clip unit 1 includes a clip 2, a pressing tube 3 as a tightening member, and a connecting member 4.

The clip 2 is formed by bending a metal plate material such as a leaf spring material made of the stainless steel or the like at the center portion thereof. The clip 2 has a pair of arms 21 that are openable and closable, and a connecting portion 22 that connects the pair of arms 21.

The pair of arms 21 has a first arm 211 and a second arm 212. The first arm 211 and the second arm 212 are arranged symmetrically with respect to a central axis O1 in the longitudinal direction of the clip unit 1. Tissue grasping portions 23 facing each other are formed at the distal ends of the pair of arms 21 respectively. The tissue grasping portions 23 are formed by bending the distal ends of the pair of arms 21 inwardly.

Engaging portions 24 protruding in the direction orthogonal to the central axis O1 are formed at the proximal ends of the pair of arms 21. The tissue grasping portion 23 side of the engaging portion 24 is formed as an acute-angled slope, and the connecting portion 22 side of the engaging portion 24 is formed as an obtuse-angled slope.

The connecting portion 22 is bent to form a U shape, and is connected to the connecting member 4. The connecting portion 22 is biased such that the pair of arms 21 are in an open state. Therefore, the pair of arms 21 of the clip 2 have a self-expanding force with respect to the open-close direction P.

The pressing tube 3 has a pressing tube main body 30 formed in a tubular shape and a protruding-recessing wing 31. The pressing tube main body 30 is formed by injection molding with a material more flexible than that of the clip 2, for example, a high-rigidity resin material having appropriate elasticity such as the PPA (polyphthalamide) and the PA (polyamide). Further, the pressing tube main body 30 may be formed of a metal instead of the high-rigidity resin material.

The protruding-recessing wing 31 is a pair of convex portions protruding from or being recessed with respect to an outer circumferential surface 30a of the pressing tube main body 30. The protruding-recessing wings 31 are provided on both sides of the central axis O1 to sandwich the central axis therebetween. The protruding-recessing wing 31 has a protruding state of protruding outwardly in a radial direction with respect to the outer circumferential surface 30a as a basic orientation. The protruding-recessing wing 31 enters a recessing state with respect to the outer circumferential surface 30a by receiving a force from outside in the radial direction toward inside in the radial direction. The protruding-recessing wing 31 returns to the protruding state from the recessing state by releasing the above-described force.

The connecting member 4 is connected to the connecting portion 22 of the clip 2. Further, the connecting member 4 connects to the arrowhead hook portion 231 that is inserted into the sheath 220. That is, the connecting member 4 connects the clip 2 and the arrowhead hook portion 231. The connecting member 4 includes an insertion portion 41 that is inserted into the internal space of the pressing tube 3, and a connecting portion 42 provided at the proximal end of the insertion portion 41.

The insertion portion 41 has a hook 41f at the distal-end portion thereof. The hook 41f is a hook extending in a direction orthogonal to the central axis O1 and is formed in a substantially cylindrical rod shape. The connecting portion 22 of the clip 2 is hooked on the hook 41f. The hook 41f is broken when a breaking force due to a traction, for example, from 20 N (Newton) to 60 N is applied to the hook 41f by pulling the connecting portion 22 toward the proximal end side.

The connecting portion 42 is an engaging portion to which the arrowhead hook portion 231 of the clip introducing device 200 is engaged (connected). The connecting portion 42 includes a connecting portion main body 43 and an elastic arm portion 44.

The elastic arm portion 44 is provided at the proximal end of the connecting portion main body 43 and the elastic arm portion 44 is branched into a bifurcated shape. The elastic arm portion 44 is elastically deformable with respect to the connecting portion main body 43, and the elastic arm portion 44 is openable and closable with respect to the connecting portion main body 43. A notch portion 44m is formed between the elastic arm portions 44 to grasp and accommodate the engaging portion 231a of the arrowhead hook portion 231. The notch portion 44m is formed in a shape to be in close contact with the outer circumferential surface of the engaging portion 231a of the arrowhead hook portion 231.

Next, the operations of the clip unit 1 will be described.

The connecting portion 22 of the clip 2 is inserted into the internal space of the pressing tube 3 from the distal-end opening 3a and is connected to the connecting member 4. When the connecting portion 22 is pulled toward the proximal-end side of the pressing tube 3 by the connecting member 4, the pair of arms 21 are pulled into the pressing tube 3 and the pair of arms 21 are gradually closed. When the traction force of the connecting portion 22 is released in this state, the clip 2 returns to the open state while moving toward the distal-end side by the self-expanding force of the pair of arms 21 as the restoring force.

By further pulling the connecting portion 22 to the proximal-end side of the pressing tube 3, the engaging portion 24 is pulled to the proximal-end side of the proximal-end opening 3b. Since the connecting portion 22 side of the engaging portion 24 is formed as the obtuse-angled slope, the engaging portion 24 can be easily pulled to the proximal-end side with respect to the proximal-end opening 3b. On the other hand, since the tissue grasping portion 23 side of the engaging portion 24 is formed as the acute-angled slope, when the engaging portion 24 is pulled to the proximal-end side of the proximal-end opening 3b, the engaging portion 24 and the proximal-end opening 3b engage with each other. As a result, the engaging portion 24 cannot enter the internal space of the pressing tube 3, and the pair of arms 21 are locked in the closed state. When the pair of arms 21 are locked in the closed state, the pair of arms 21 cannot return to the open state.

[Cartridge 5]

Figure 4:
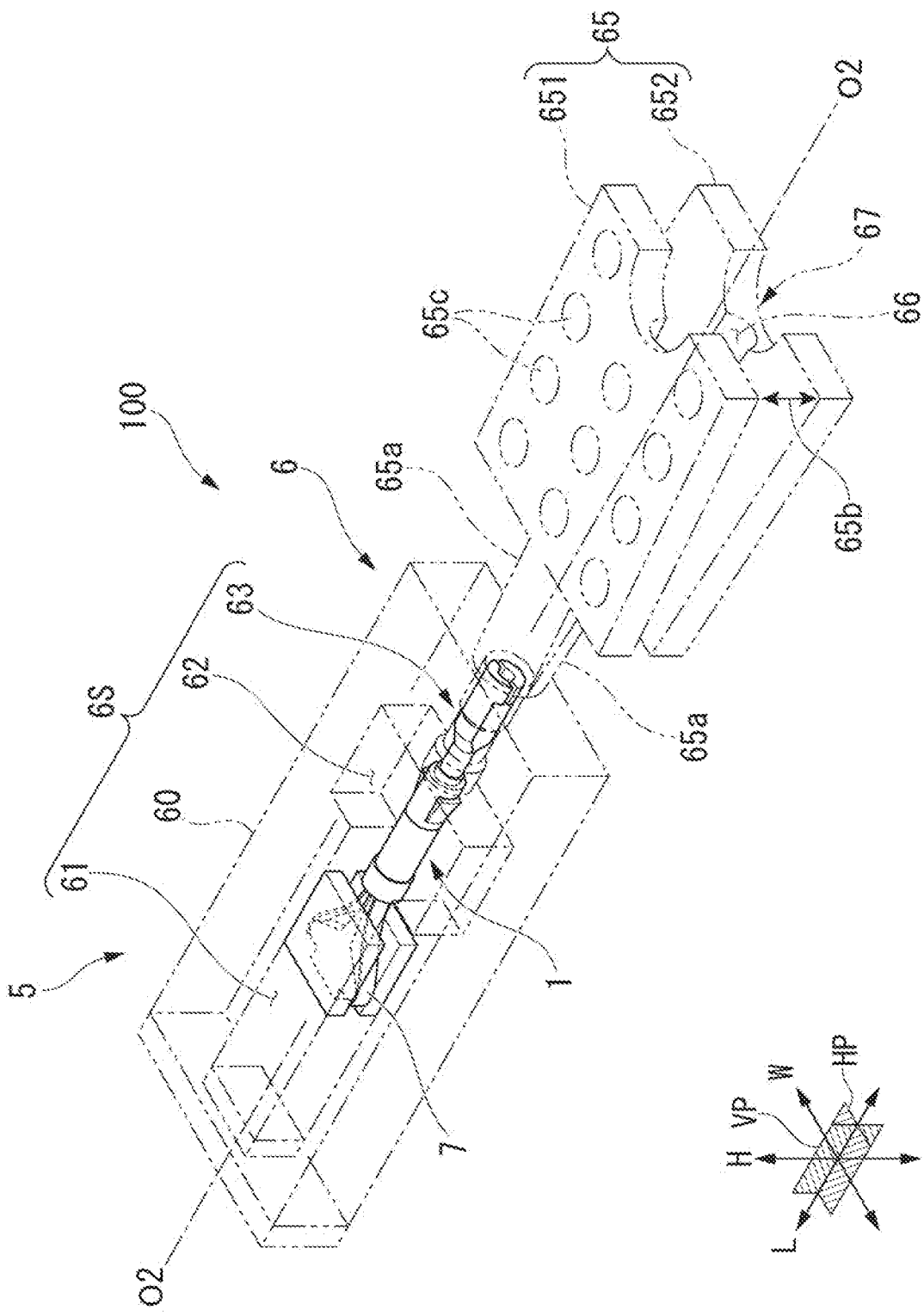
FIG. 4 is a perspective view showing a cartridge accommodating the clip unit.
Figure 5:
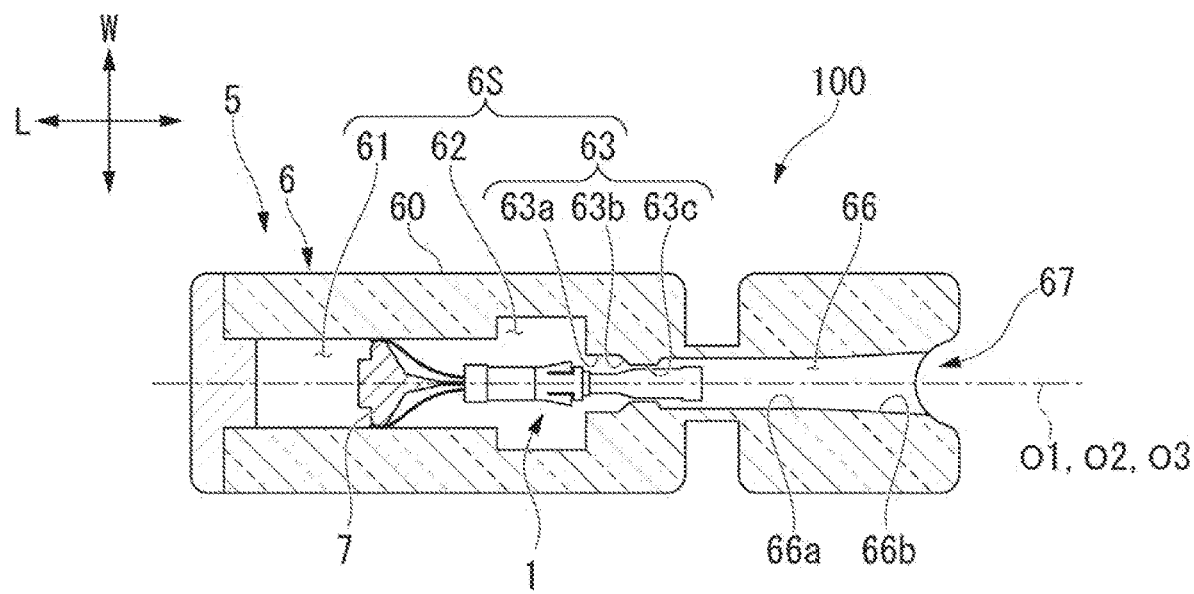
FIG. 5 is a cross-sectional view of the cartridge accommodating the clip unit.

FIG. 4 is a perspective view showing the cartridge 5 in which the clip unit 1 is accommodated. FIG. 5 is a cross-sectional view showing the cartridge 5 in which the clip unit 1 is accommodated.

The cartridge 5 includes a case 6 and a regulating member 7. A width of the cartridge 5 is about 10 mm to 20 mm, a length thereof is about 50 mm, and a thickness is about 5 mm, and the cartridge 5 is formed in a size that is easy to be held in the hand.

As shown in FIG. 4, one of the two directions orthogonal to the longitudinal direction L of the cartridge 5 is defined as the "width direction W", and the other of the two directions orthogonal to the longitudinal direction L of the cartridge 5 is defined as the "height direction H". Furthermore, a surface being horizontal to the longitudinal direction L and the width direction W is referred to as a "horizontal plane HP". A plane being horizontal to the longitudinal direction L and the height direction H is referred to as a "vertical plane VP". Further, in the cartridge 5 in which the clip unit 1 is accommodated, the pair of arms 21 side is defined as the distal-end side of the cartridge 5, and the connecting member 4 side is defined as the proximal-end side of the cartridge 5.

The case 6 includes a case main body 60, a squeezing portion 65, and a sheath connecting portion 66. The case 6 is manufactured by injection molding with a transparent resin material having an appropriate rigidity such as ABS, PC, PP, PS, acrylic, cycloolefin polymer and the like. The case 6 is formed of the transparent resin material, and it is easy for the user to determine whether or not the clip unit 1 is present inside.

The case main body 60 is formed in a rectangular box shape. The length of the case main body 60 in the width direction W is longer than the length of the case main body 60 in the height direction H.

The case main body 60 is formed with an accommodation region 6S in which the clip unit 1 is movably accommodated in the longitudinal direction L. The accommodation region 6S includes a first region 61, a second region 62, and a folding portion 63. As shown in FIG. 5, the first region 61, the second region 62, and the folding portion 63 are arranged from the distal end to the proximal end in the longitudinal direction L of the case 6. The first region 61, the second region 62, and the folding portion 63 form the internal space that is symmetrical with respect to the vertical plane VP including the central axis O2 in the longitudinal direction L of the accommodation region 6S.

Figure 6:
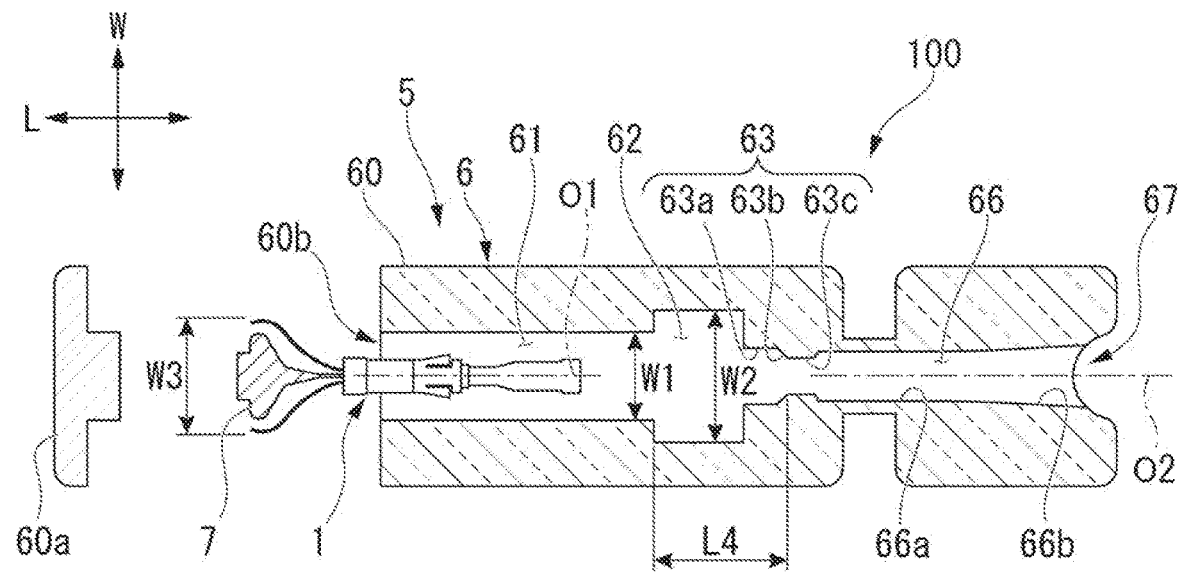
FIG. 6 is a cross-sectional view showing the cartridge whose lid is open.

FIG. 6 is a cross-sectional view showing the cartridge 5 with the lid 60a removed.

The case main body 60 has the lid 60a at the distal end thereof. The lid 60a opens and closes the opening 60b on the distal-end side in the accommodation region 6S of the case main body 60. The clip unit 1 is accommodated in the accommodation region 6S of the case main body 60 from the opening 60b.

As shown in FIG. 6, the clip unit 1 is accommodated in the accommodation region 6S such that the central axis O1 of the clip unit 1 is along the longitudinal direction L of the case 6. The clip unit 1 is accommodated in the accommodation region 6S such that the open-close direction P of the pair of arms 21 coincides with the width direction W of the case 6.

The first region 61 is the internal space in which the clip unit 1 is movably accommodated in the longitudinal direction L. The first region 61 communicates with the second region 62.

The second region 62 is the internal space in which the clip unit 1 is movably accommodated in the longitudinal direction L. The length of the second region 62 in the longitudinal direction L is shorter than the length of the first region 61 in the longitudinal direction L. The second region 62 communicates with the folding portion 63.

As shown in FIG. 6, the length W1 of the first region 61 in the width direction W is smaller than the open width W3 of the pair of arms 21 in the open state. Further, the length W2 of the second region 62 in the width direction W is larger than the open width W3 of the pair of arms 21 in the open state.

The folding portion 63 includes an enlarged-diameter portion 63a, a tapered portion 63b, and a reduced-diameter portion 63c. The enlarged-diameter portion 63a, the tapered portion 63b, and the reduced-diameter portion 63c are arranged from the distal end to the proximal end.

The enlarged-diameter portion 63a is a region that allows the elastic arm portion 44 of the connecting member 4 to elastically expand (open and close). In the enlarged-diameter portion 63a, when the arrowhead hook portion 231 of the clip introducing device 200 and the connecting member 4 of the clip unit 1 are engaged with each other, the elastic arm portion 44 of the connecting member 4 is openable and closeable in the direction orthogonal to the central axis O1.

The tapered portion 63b is provided on the proximal-end side of the enlarged-diameter portion 63a and the tapered portion 63b is formed in a tapered shape. The diameter of the tapered portion 63b is increased from the proximal-end side toward the distal-end side. Therefore, when the pressing tube 3 is slid from the distal-end side toward the proximal-end side, the protruding-recessing wing 31 of the pressing tube 3 is accommodated inside the pressing tube main body 30.

The reduced-diameter portion 63c is a region for maintaining the protruding-recessing wing 31 in the recessing state. The reduced-diameter portion 63c can hold the elastic arm portion 44 in a state where the elastic arm portion 44 of the connecting member 4 is prevented from expanding when the clip unit 1 is accommodated in the cartridge 5.

When the pressing tube 3 slides the tapered portion 63b from the distal-end side toward the proximal-end side, the protruding-recessing wing 31 of the pressing tube 3 is accommodated inside the pressing tube 3. Therefore, the reduced-diameter portion 63c smoothly connected to the tapered portion 63b can be held in a state where the protruding-recessing wing 31 of the pressing tube 3 is accommodated.

As shown in FIG. 4, the squeezing portion 65 is a plate-shaped member provided at the proximal end of the case main body 60. The squeezing portion 65 has a first squeezing portion 651 and a second squeezing portion 652. The first squeezing portion 651 and the second squeezing portion 652 are provided so as to face each other in the height direction H of the case 6.

The squeezing portion 65 has a connecting portion 65a that is connected to the case main body 60. The connecting portion 65a separately connects the first squeezing portion 651 and the second squeezing portion 652 to the case main body 60. The connecting portion 65a is bent such that the first squeezing portion 651 and the second squeezing portion 652 are separated from each other. Therefore, an interval 65b is formed between the first squeezing portion 651 and the second squeezing portion 652. The first squeezing portion 651 and the second squeezing portion 652 are further separated from each other on the proximal-end side than on the distal-end side.

The first squeezing portion 651 and the second squeezing portion 652 are formed in a size suitable for picking with fingers, for example, about 20 mm square. On the outer surfaces of the first squeezing portion 651 and the second squeezing portion 652, for example, a plurality of hemispherical concave portions 65c are formed as anti-slip during squeezing.

The sheath connecting portion 66 is an insertion groove into which the sheath 220 can be inserted. The sheath connecting portion 66 is an arc-shaped groove formed on the inner surfaces of the first squeezing portion 651 and the second squeezing portion 652, and the sheath connecting portion 66 communicates with the reduced-diameter portion 63c of the folding portion 63 in the accommodation region 6S. The sheath connecting portion 66 has a straight portion 66a whose diameter does not change, and a tapered portion 66b whose diameter gradually increases toward the inlet port 67 on the proximal-end side. The sheath 220 enters the straight portion 66*a* via the tapered portion 66*b* and abuts on the proximal-end side of the reduced-diameter portion 63*c*. The inner diameter of the inlet port 67 is, for example, equal to or more than 3 mm.

The user can fix the sheath 220 to the case 6 by squeezing the first squeezing portion 651 and the second squeezing portion 652 with the sheath 220 inserted into the sheath connecting portion 66 from the inlet port 67.

Figure 7:
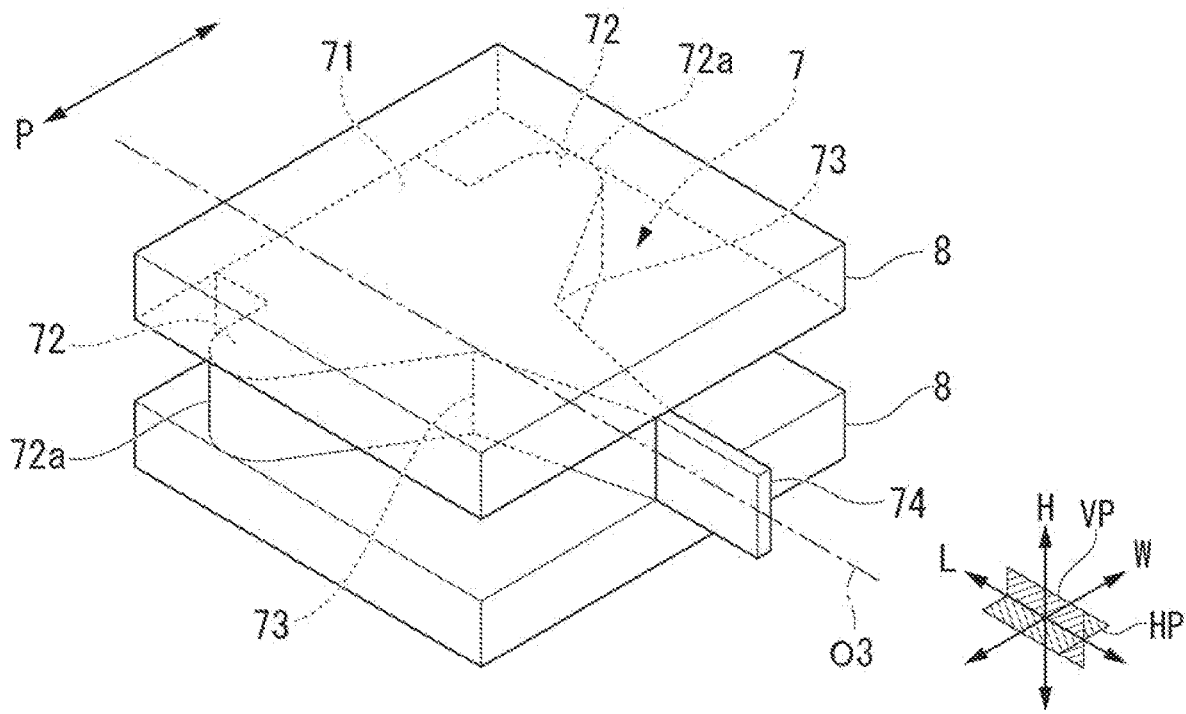
FIG. 7 is a perspective view showing a regulating member of the cartridge.

FIG. 7 is a perspective view showing the regulating member 7.

The regulating member 7 is movably accommodated in the first region 61 and the second region 62 together with the clip unit 1. The regulating member 7 is made of, for example, the same resin as that of the case 6. The regulating member 7 does not have to be made of the transparent resin as that of the case 6.

As shown in FIG. 7, the regulating member 7 is formed in a symmetrical shape with respect to the vertical plane VP including the central axis O3. The regulating member 7 has a distal-end portion 71, a protruding portion 72, a tapered portion 73, and a pressing portion 74. The distal-end portion 71, the protruding portion 72, the taper portion 73, and the pressing portion 74 are arranged from the distal end toward the proximal end along the central axis O3 direction of the regulating member 7.

Figure 8:
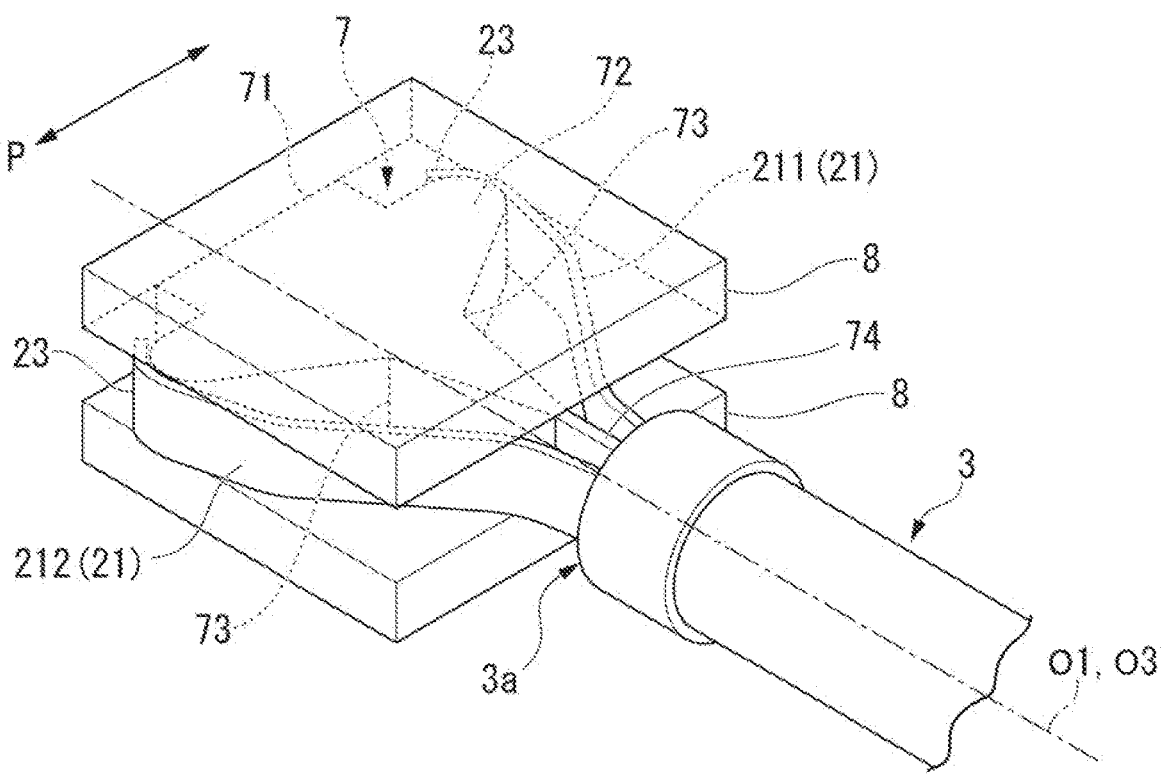
FIG. 8 is a perspective view showing the regulating member that is grasped by a pair of arms.

FIG. 8 is a perspective view showing the regulating member 7 grasped by the pair of arms 21.

The regulating member 7 is grasped by the clip 2 so as to make the central axis O3 to be substantially coincided with the central axis O1 of the clip unit 1. As shown in FIG. 5, the clip unit 1 is accommodated in the accommodation region 6S with the clip 2 holding the regulating member 7. At this time, it is desirable that the central axis O1, the central axis O2, and the central axis O3 coincide with each other.

The distal-end portion 71 protrudes from the protruding portion 72 toward the distal-end side. The distal end of the distal-end portion 71 is located at the further distal-end side of the tissue grasping portion 23 of the clip 2 that grasps the regulating member 7. Therefore, the distal-end portion 71 prevents the tissue grasping portion 23 of the clip 2 from coming into contact with the case main body 60. Further, the distal end of the distal-end portion 71 is formed on a plane orthogonal to the central axis O3.

The protruding portion 72 is a member that protrudes in a direction orthogonal to the central axis O3 (hereinafter referred to as "protruding direction P"). The protruding portions 72 are provided on both sides of the central axis O3 to sandwich the central axis O3 therebetween. The protruding portion 72 is grasped by the first arm 211 and the second arm 212. The open-close direction P of the pair of arms 21 that grasp the protruding portion 72 substantially coincides with the protruding direction P of the protruding portion 72. The curvature of the outer circumferential surface of the protruding portion 72 is smaller than the curvature of the inner circumferential surface of the tissue grasping portion 23. Therefore, the pair of arms 21 can definitely grasp the protruding portion 72.

The tapered portion 73 is a member formed in a tapered shape. The tapered portions 73 are provided on both sides of the central axis O3 to sandwich the central axis O3 therebetween. The length of the tapered portion 73 in the protruding direction P is shorter than that of the protruding portion 72. The length of the tapered portion 73 in the protruding direction P becomes shorter from the distal-end side toward the proximal-end side.

The pressing portion 74 is a plate-shaped member configured to regulate the minimum approaching distance between the clip 2 and the pressing tube 3. The pressing portion 74 is provided on the proximal-end side of the tapered portion 73. Since the pressing portion 74 engages with the edge of the distal-end opening 3*a*, the pressing portion 74 cannot enter the internal space of the pressing tube 3 from the distal-end opening 3*a*. Therefore, even in a case in which the clip 2 is pulled in the direction approaching the pressing tube 3, the pressing portion 74 engages with the edge of the distal-end opening 3*a* to regulate the minimum approaching distance between the clip 2 and the pressing tube 3. In other words, the regulating member 7 acts as a spacer.

As shown in FIG. 7, the regulating member 7 is sandwiched by the assistance member 8 from the height direction H. The assistance member 8 adjusts the position of the regulating member 7 in the height direction H such that the regulating member 7 is grasped by the pair of arms 21. When it is not necessary to adjust the position of the regulating member 7 in the height direction, the assistance member 8 is unnecessary.

Figure 9:
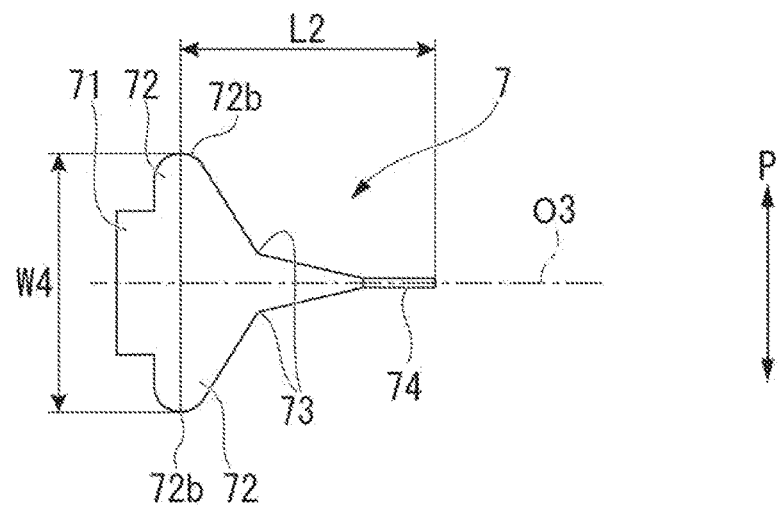
FIG. 9 is a planar view showing the regulating member.

FIG. 9 is a plan view of the regulating member 7.

In the protruding portion 72, the portion most protruding from the central axis O3 in the protruding direction P is defined as the maximum protruding point 72*b*. A length W4 between the maximum protruding point 72*b* is slightly smaller than the length W1 in the width direction W of the first region 61. A length L2 in the central axis O3 direction from the maximum protruding point 72*b* to the proximal end of the pressing portion 74 is defined.

Figure 10:
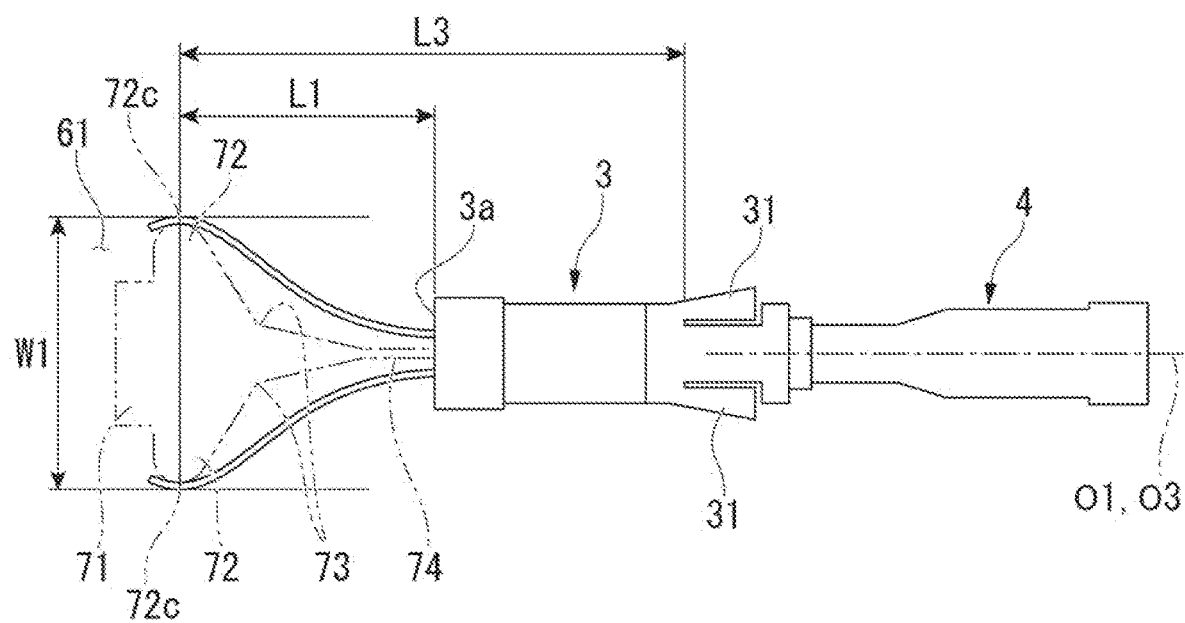
FIG. 10 is a planar view showing the regulating member that is grasped in a first region.

FIG. 10 is a plan view of the regulating member 7 grasped in the first region 61.

The regulating member 7 is accommodated in the first region 61 in a state of being grasped by the pair of arms 21. The length W1 of the first region 61 in the width direction W is smaller than the open width W3 of the pair of arms 21 in the open state. Therefore, the pair of arms 21 grasp the regulating member 7 that is in the closed state from the open state. The opening width of the pair of arms 21 is about the length W1 in the width direction W of the first region 61. The pair of arms 21 come into contact with the case main body 60 in the open-close direction P. A length L1 in the central axis O3 direction from a contact point 72*c* between the pair of arms 21 and the case main body 60 to the proximal end of the pressing portion 74 is defined.

It is desirable that the length L1 in the central axis O3 direction from the contact point 72*c* to the proximal end of the pressing portion 74 is equal to or larger than the length L2 in the central axis O3 direction from the maximum protruding point 72*b* to the proximal end of the pressing portion 74. This is to ensure that the clip 2 definitely engage with the regulating member 7 to be pulled toward the proximal-end side when the clip 2 is pulled toward the proximal-end side.

As shown in FIG. 9 and FIG. 10, the length W4 between the maximum protrusion points 72*b* is slightly smaller than the length W1 in the width direction W of the first region 61. Therefore, the regulating member 7 is maintained in the state of being grasped by the pair of arms 21 in the first region 61.

The length L3 (see FIG. 10) in the central axis O1 direction and the central axis O3 direction from the contact point 72*c* to the distal end of the protruding-recessing wing 31 is equal to or larger than the distance IA from the distal end of the second region 62 to the proximal end of the tapered portion 63*b* (see FIG. 6).

Next, the operations of the cartridge system 100 will be described. FIG. 11 to FIG. 17 are views for describing a method of loading the clip unit 1 into the clip introduction device 200 by using the cartridge 5.

Figure 11:
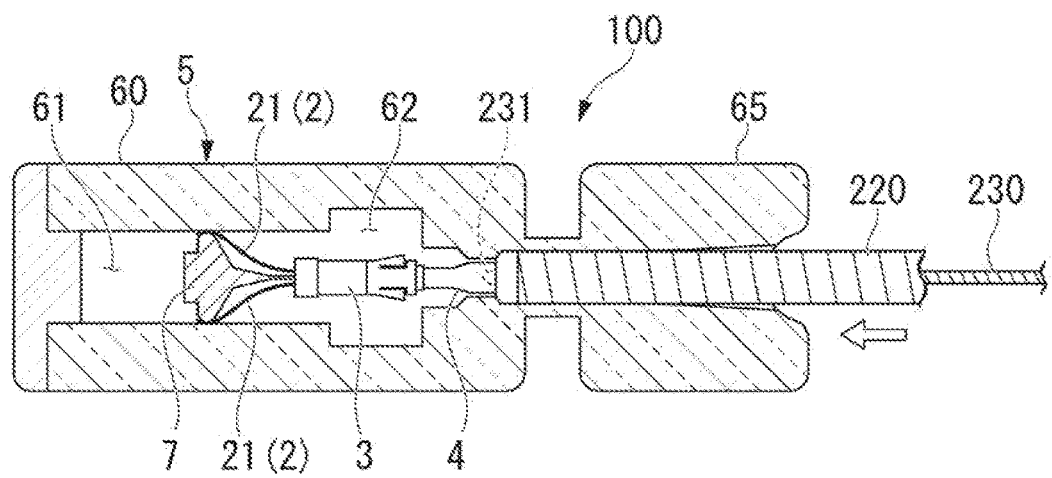
FIG. 11 is a view showing a method of loading the clip unit by using the cartridge.

As shown in FIG. 11, the user inserts the sheath 220 of the clip introducing device 200 from the sheath connecting portion 66 into the accommodation region 6S of the case 6. The user squeezes the sheath 220 with the squeezing portion 65 and fixes the sheath 220 with respect to the case 6.

Figure 12:
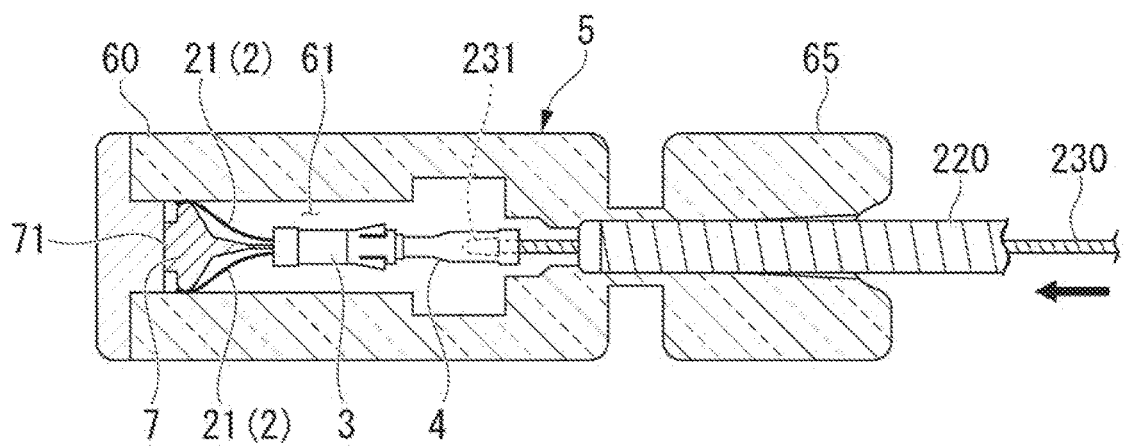
FIG. 12 is a view showing a method of loading the clip unit by using the cartridge.

As shown in FIG. 12, the user operates the operation portion 240 to advance the operation wire 230 with respect to the sheath 220, thereby advancing the arrowhead hook portion 231. The arrowhead hook portion 231 is connected to the connecting member 4 of the clip unit 1.

The distal end of the distal-end portion 71 of the regulating member 7 is formed on a plane orthogonal to the central axis O3. Therefore, even in the case in which the distal end of the clip unit 1 that is pushed toward the distal-end side by the arrowhead hook portion 231 comes into contact with the case main body 60, it is difficult for the central axis O1 of the clip unit 1 to be displaced with respect to the central axis O2 of the accommodation region 6S.

Figure 13:
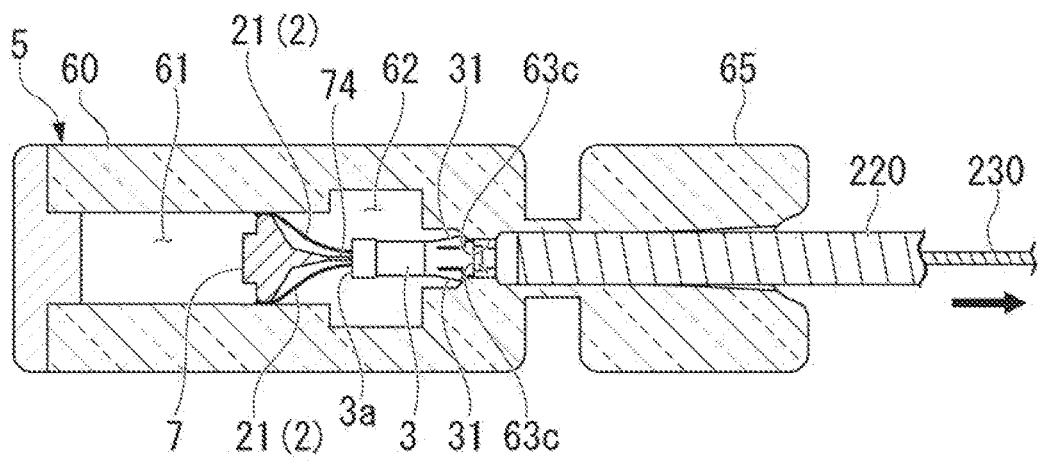
FIG. 13 is a view showing the method of loading the clip unit by using the cartridge.

The user pulls the operation wire 230 as shown in FIG. 13. The clip 2 of the clip unit 1 is pulled toward the proximal-end side by the connecting member 4 connected to the arrowhead hook portion 231. The hook 41f of the connecting member 4 pulls the connecting portion 22 of the clip 2 without the hook 41f being broken. The regulating member 7 moves in the first region 61 of the accommodation region 6S in a state of being in contact with the pair of arms 21. Since the pair of arms 21 having the self-expanding force engage with the edge of the distal-end opening 3a of the pressing tube 3, the pressing tube 3 is also pulled toward the proximal-end side together with the clip 2.

The pair of arms 21 abut on the case main body 60 in the open-close direction P in the first region 61. It is possible to suitably to prevent the clip 2 from being retracted to the internal space of the pressing tube 3 and being locked in the closed state by the pressing tube 3 due to the friction force generated by the pair of arms 21 coming into contact with the case main body 60.

When the clip 2 is pulled toward the proximal-end side, the pressing portion 74 of the regulating member 7 engages with the edge of the distal-end opening 3a of the pressing tube 3, such that the minimum approaching distance between the clip 2 and the pressing tube 3 is restricted. The pressing portion 74 comes into contact with the pressing tube 3 in a state of being in contact with the pair of arms 21 by the traction of the operation wire 230 so as to restrict the relative movement of the regulating member 7 with respect to the pressing tube 3. Also, it is possible to suitably prevent the clip 2 that is pulled toward the proximal-end side by the connecting member 4 from being drawn into the internal space of the pressing tube 3 and being locked in the closed state by the pressing tube 3.

Figure 14:
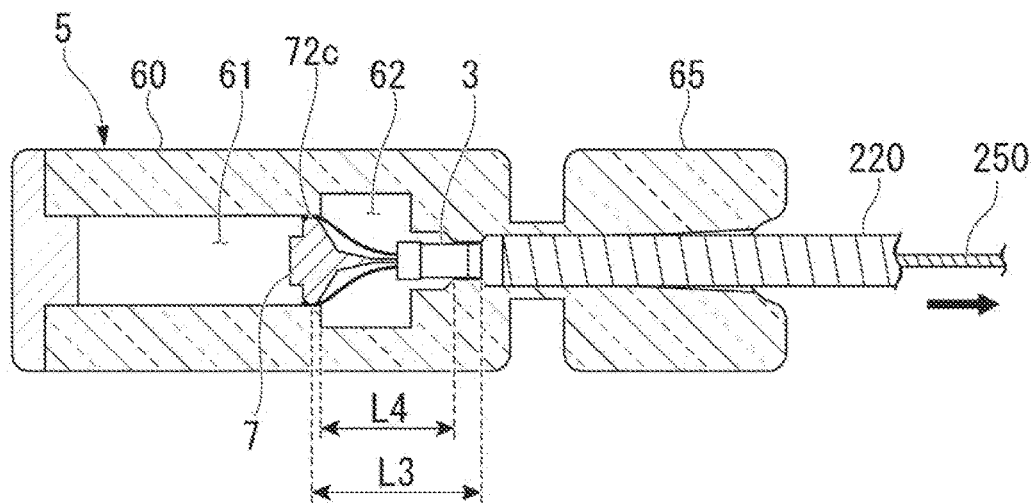
FIG. 14 is a view showing the method of loading the clip unit by using the cartridge.

The user further pulls the clip unit 1 toward the proximal-end side. As shown in FIG. 14, the pressing tube 3 passes through the folding portion 63. The pressing tube 3 slides the reduced-diameter portion 63c from the distal-end side toward the proximal-end side, and the protruding-recessing wing 31 of the pressing tube 3 is accommodated inside the pressing tube main body 30. The pressing tube 3 in which the protruding-recessing wing 31 is accommodated inside the pressing tube main body 30 is pulled into the sheath 220.

As shown in FIG. 14, the length L3 in the central axis O1, O3 directions from the contact point 72c to the distal end of the protruding-recessing wing 31 is equal to or larger than a distance L4 from the distal end of the second region 62 to the proximal end of the tapered portion 63b. Therefore, when the protruding-recessing wing 31 of the pressing tube 3 is accommodated inside the pressing tube 3, the contact point 72c between the pair of arms 21 and the case main body 60 is located in the first region 61. That is, until the protruding-recessing wing 31 is accommodated inside the pressing tube 3, the pair of arms 21 grasp the regulating member 7 and the pair of arms 21 are not drawn into the internal space of the pressing tube 3.

Figure 15:
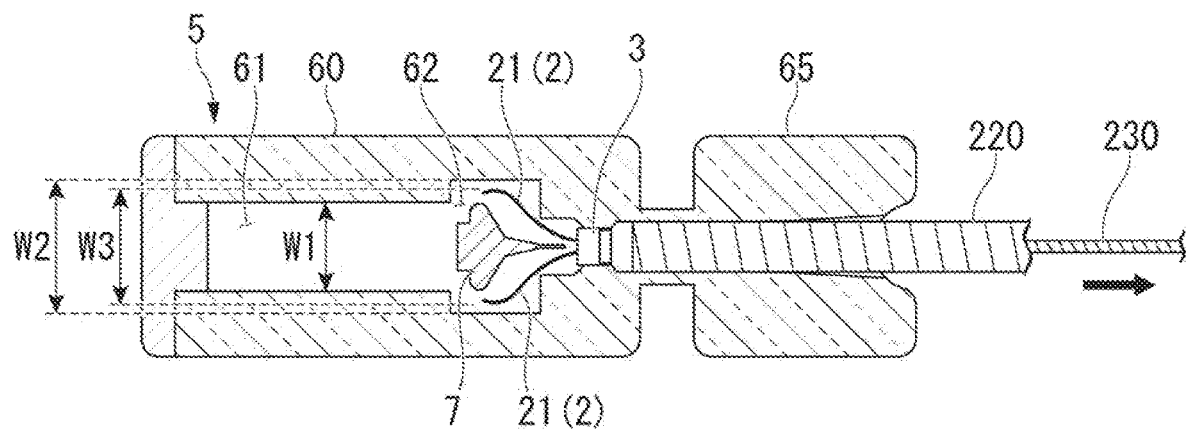
FIG. 15 is a view showing the method of loading the clip unit by using the cartridge.

As shown in FIG. 15, the user further pulls the operation wire 230 to pull the regulating member 7 to the second region 62. The length W2 of the second region 62 in the width direction W is larger than the open width W3 of the pair of arms 21 in the open state. Therefore, the regulating member 7 is not grasped by the pair of arms 21 in the second region 62.

Figure 16:
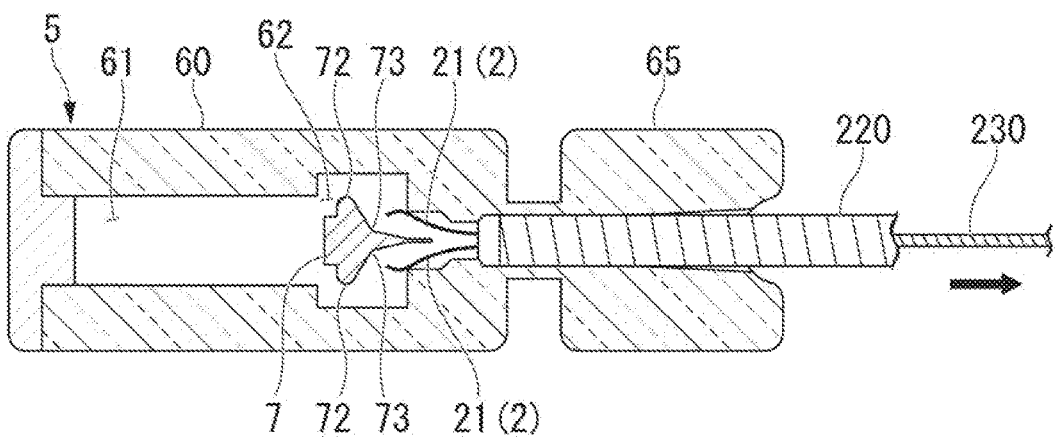
FIG. 16 is a view showing the method of loading the clip unit by using the cartridge.

The user further pulls the operation wire 230 as shown in FIG. 16. The clip 2 is separated from the regulating member 7 and pulled toward the proximal-end side. The regulating member 7 has a tapered portion 73 formed on the proximal-end side of the protruding portion 72 grasped by the pair of arms 21. Therefore, when the regulating member 7 is pulled toward the proximal-end side, it is difficult for the pair of arms 21 to be caught by the regulating member 7.

Figure 17:
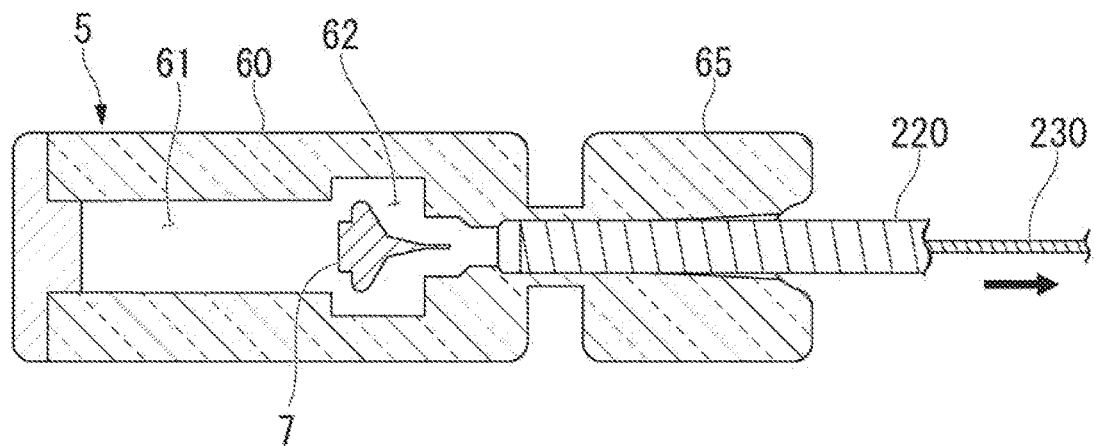
FIG. 17 is a view showing the method of loading the clip unit by using the cartridge.

The user further pulls the operation wire 230 as shown in FIG. 17. Since the pair of arms 21 do not grasp the regulating member 7, the minimum approaching distance between the clip 2 and the pressing tube 3 is not regulated. The clip 2 pulled to the proximal-end side is pulled into the sheath 220 while being pulled into the internal space of the pressing tube 3. The clip 2 may be pulled into the sheath 220 without being pulled into the internal space of the pressing tube 3. As a result, the loading of the clip unit 1 into the clip introducing device 200 is completed. The user releases the squeezing of the sheath 220 by the squeezing portion 65 and pulls out the sheath 220 from the case 6.

According to the cartridge system 100 of the present embodiment, the clip unit 1 can be easily loaded into the clip introduction device 200 without the clip 2 having the self-expanding force being locked in the closed state by the pressing tube 3.

Although the present embodiment of the present disclosure has been described in detail with reference to the drawings, the specific configuration is not limited to this embodiment, and includes design changes and the like within a range that does not deviate from the scope of the present disclosure. Further, the configurational components shown in the above-described embodiment and the modification examples shown below can be appropriately combined and configured.

Modification Example 1

For example, in the above-described embodiment, the regulating member 7 has the distal-end portion 71, the protruding portion 72, the tapered portion 73, and the pressing portion 74; however, the aspect of the regulating member 7 is not limited to this configuration. The regulating member 7 may include the protruding portion 72 pinched by the tissue grasping portion 23 of the clip 2, and the proximal-end side of the protruding portion 72 may be formed in a shape that is difficult for the tissue grasping portion 23 of the clip 2 to be sandwiched.

Figure 18:
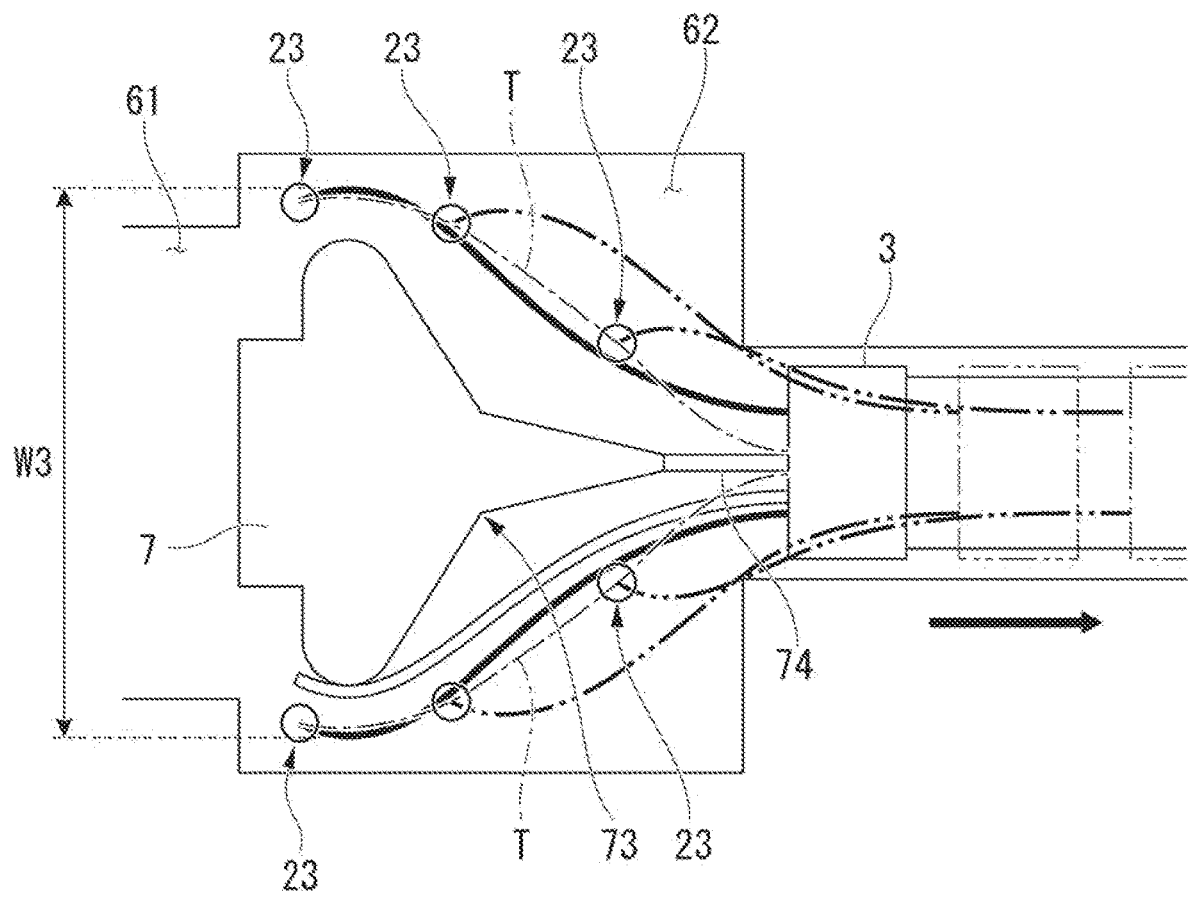
FIG. 18 is a view describing a shape of the regulating member that is difficult to be clamped by the clip.

FIG. 18 is a view showing the shape of the regulating member 7 in which the clip 2 is difficult to be pinched.

When the regulating member 7 is pulled to the second region 62, the pair of arms 21 do not grasp the regulating member 7 and extend to the open width W3 in the open state. The clip 2 is further pulled toward the proximal-end side. It is desirable that the proximal-end side of the protruding portion 72 of the regulating member 7 has a shape that does not interfere with the trajectory of the tissue grasping portion 23 when the clip 2 is pulled.

Figure 19:
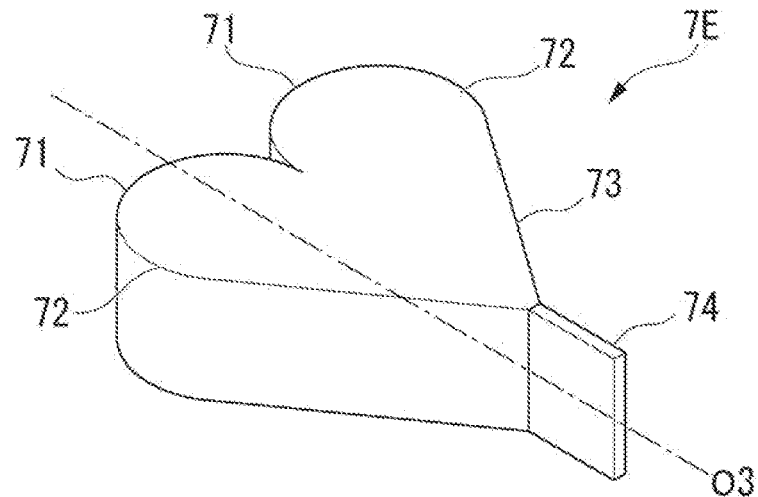
FIG. 19 is a view showing a modification example of the regulating member.
Figure 20:
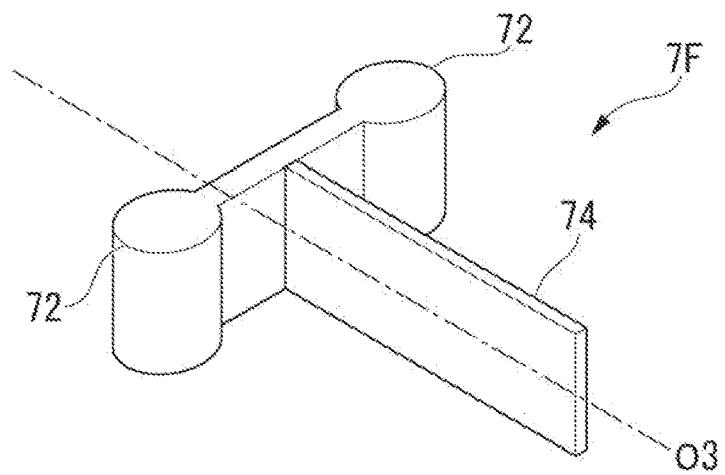
FIG. 20 is a view showing a modification example of the regulating member.
Figure 21:
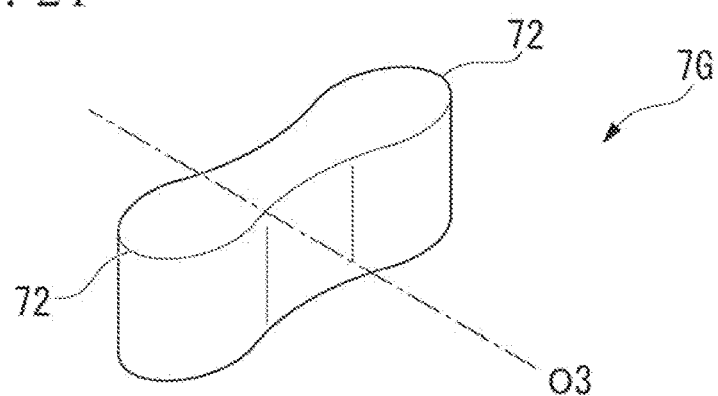
FIG. 21 is a view showing a modification example of the regulating member.

FIG. 19 to FIG. 21 are views showing the modification example of the regulating member 7.

The regulating member 7E shown in FIG. 19, which is a modification example of the regulating member 7, is formed in a heart shape. The regulating member 7E has the protruding portion 72, the tapered portion 73, and the pressing portion 74. The proximal-end side of the protruding portion 72 of the regulating member 7E has a shape that does not interfere with the trajectory of the tissue grasping portion 23 when the clip 2 is pulled.

The regulating member 7F as shown in FIG. 20, which is a modification example of the regulating member 7, has the protruding portion 72 and the pressing portion 74. The regulating member 7F does not have the tapered portion 73, and the protruding portion 72 and the pressing portion 74 are directly connected to each other. The proximal-end side of the protruding portion 72 of the regulating member 7F has a shape that does not interfere with the trajectory of the tissue grasping portion 23 when the clip 2 is pulled.

The regulating member 7G as shown in FIG. 21, which is a modification example of the regulating member 7, has only the protruding portion 72. The proximal-end side of the protruding portion 72 of the regulating member 7G has a shape that does not interfere with the trajectory of the tissue grasping portion 23 when the clip 2 is pulled.

Modification Example 2

Figure 22:
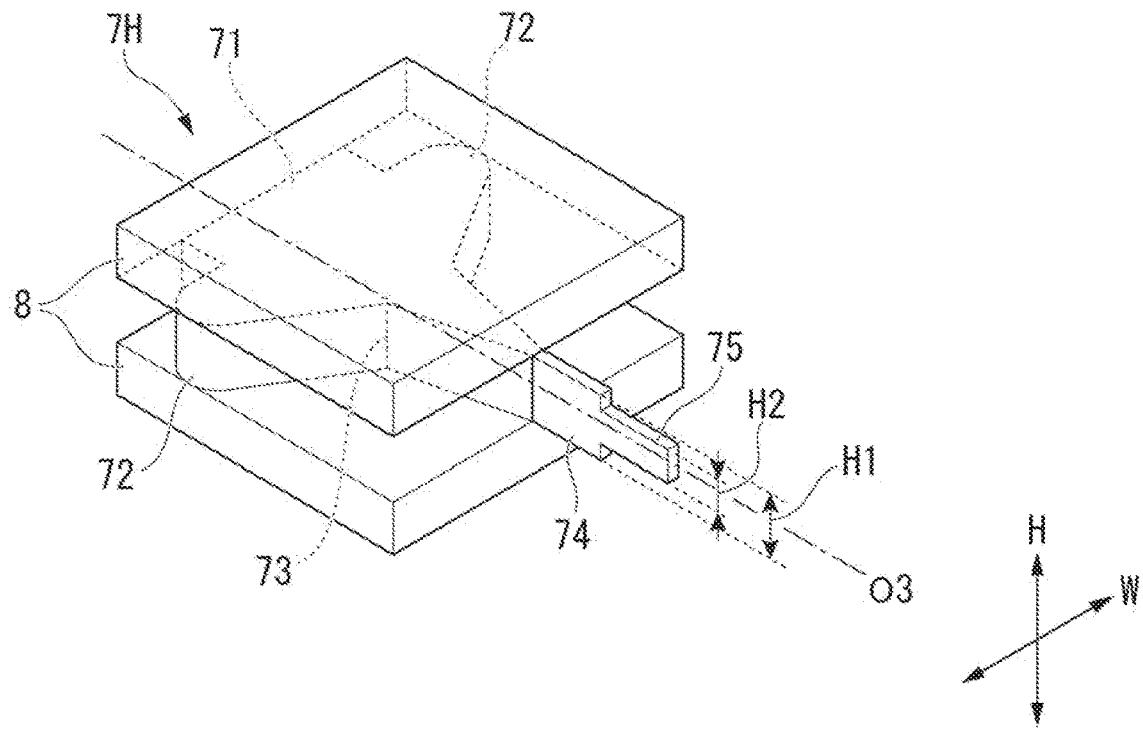
FIG. 22 is a perspective view showing a modification example of the regulating member.

The regulating member 7 may further have an intrusion portion 75 on the proximal-end side of the pressing portion 74. FIG. 22 is a perspective view showing the regulating member 7H, which is a modification example of the regulating member 7. The regulating member 7H has the distal-end portion 71, the protruding portion 72, the tapered portion 73, the pressing portion 74, and the intrusion portion 75. The intrusion portion 75 is a plate-shaped member provided on the proximal-end side of the pressing portion 74. The length H2 of the intruding portion 75 in the height direction H is shorter than the length H1 of the pressing portion 74 in the height direction H.

Figure 23:
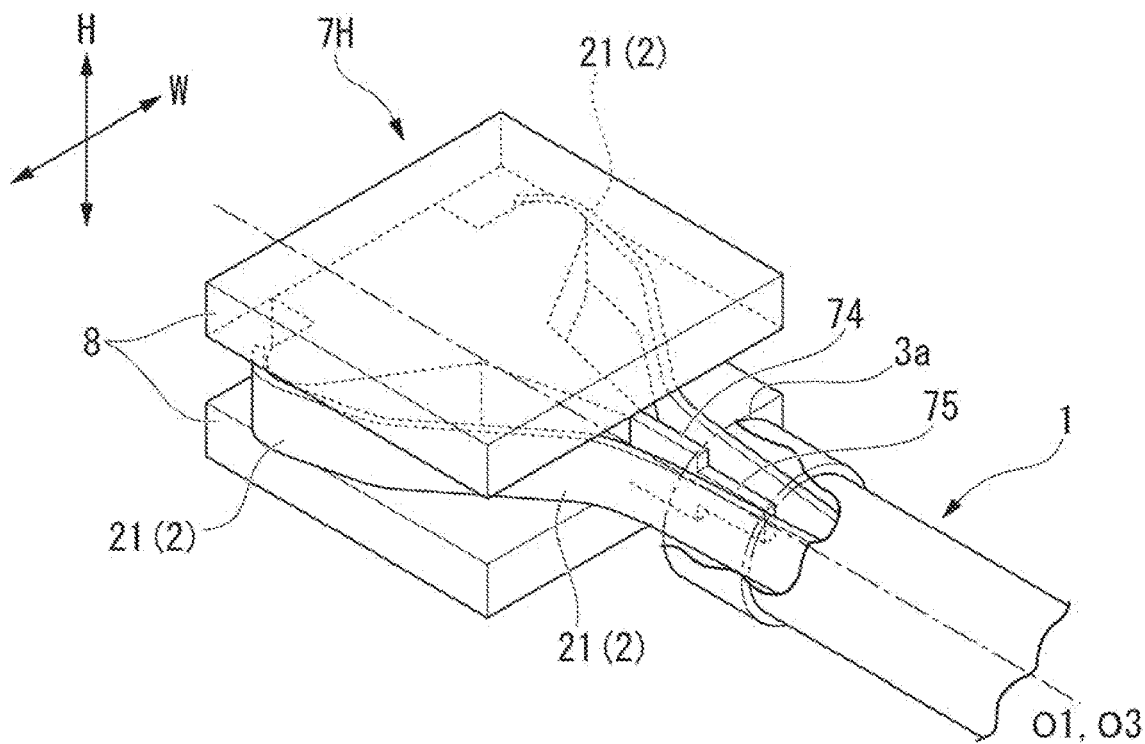
FIG. 23 is a perspective view showing the modification example of the regulating member that is grasped by a pair of arms.

FIG. 23 is a perspective view of the regulating member 7H grasped by the pair of arms 21.

Figure 24:
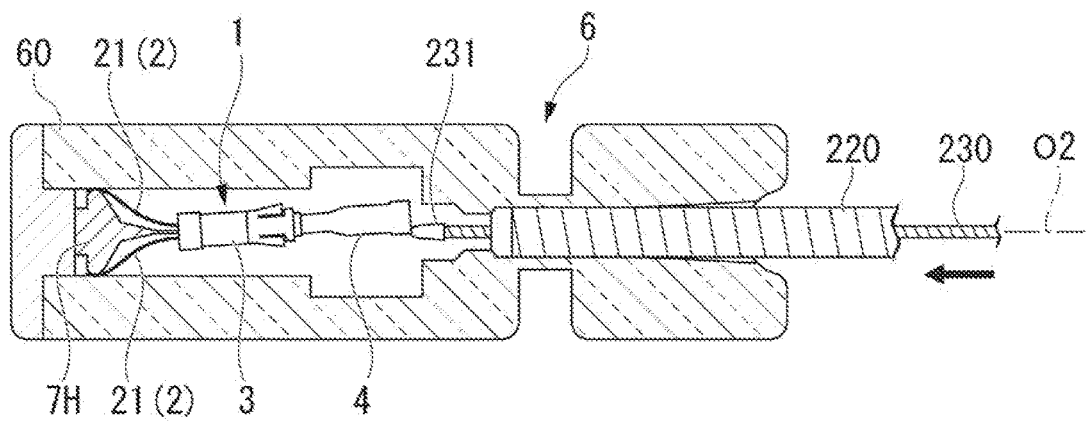
FIG. 24 is a view showing the clip unit in which a connection member is deviated from a central axis.

The pressing portion 74 engages with the edge of the distal-end opening 3a of the pressing tube 3. On the other hand, the length H2 of the intrusion portion 75 in the height direction H is slightly smaller than the inner diameter of the distal-end opening 3a. Therefore, the intrusion portion 75 invades the internal space of the pressing tube 3. Further, it is difficult for the restricting member 7H in which the invading portion 75 has invaded the internal space of the pressing tube 3 to shift in the width direction W since the invading portion 75 is in contact with the inner circumferential surface of the pressing tube 3. Therefore, as shown in FIG. 24, when the connecting member 4 and the arrowhead hook portion 231 are connected, it is possible to prevent the connecting member 4 from being displaced from the central axis O2.

Modification Example 3

Figure 25:
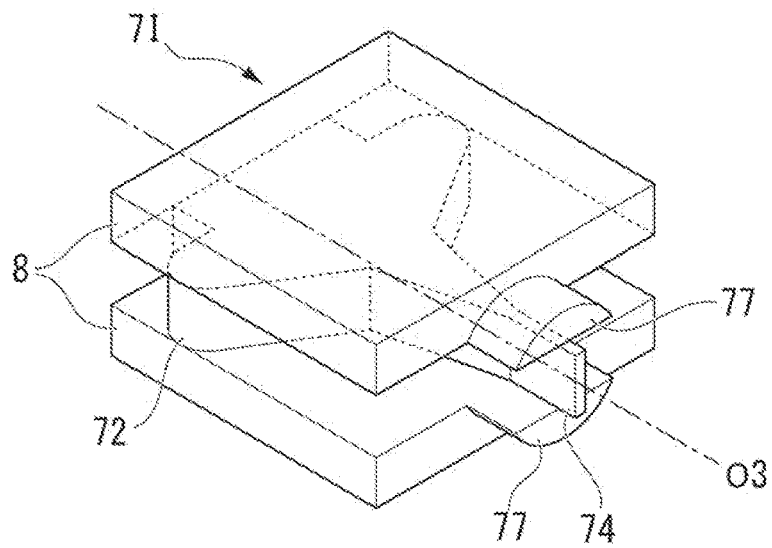
FIG. 25 is a perspective view showing a modification of the regulating member.
Figure 26:
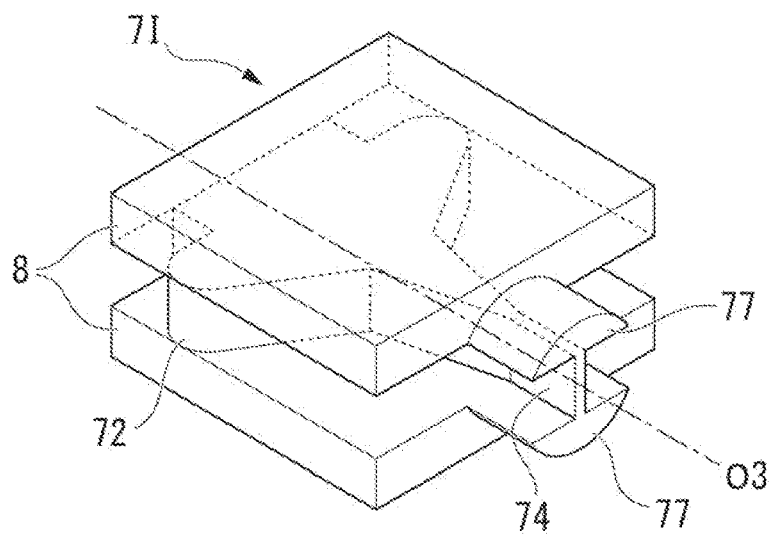
FIG. 26 is a perspective view showing a modification of the regulating member.
Figure 27:
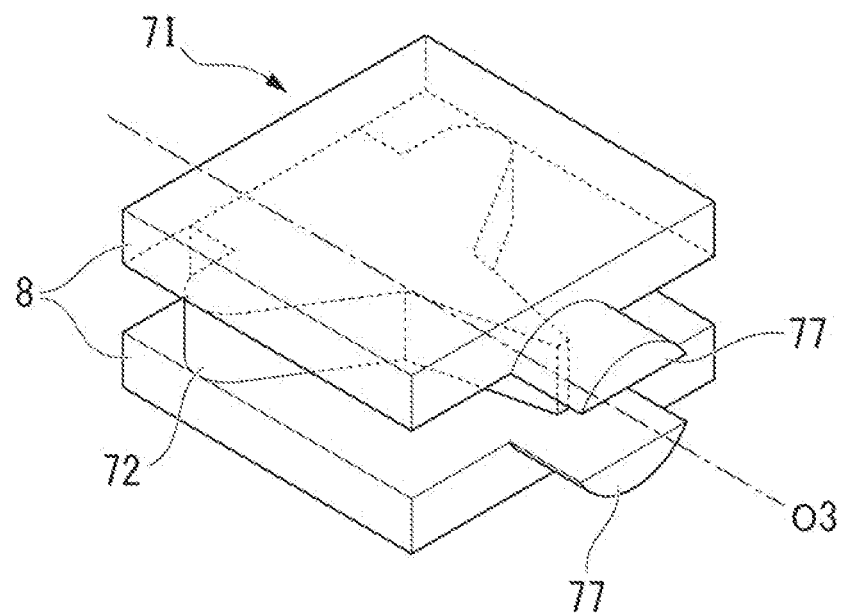
FIG. 27 is a perspective view showing a modification of the regulating member.

The regulating member 7 may further have a reinforcing portion 77 on the proximal-end side of the regulating member. FIG. 25 to FIG. 27 are perspective views showing a regulating member 71 which is a modification example of the regulating member 7. The regulating member 71 further has the reinforcing portion 77 on the proximal-end side as compared with the regulating member 7. In FIGS. 25 and 26, the reinforcing portions 77 are provided on both sides of the pressing portion 74 in the height direction H. The reinforcing portion 77 reinforces the pressing portion 74, which is the thinnest member of the regulating member 71. Even when the regulating member 71 including the pressing portion 74 is integrally molded with a resin or the like, the pressing portion 74 of the regulating member 71 has sufficient strength.

As shown in FIG. 25, the length of the reinforcing portion 77 in the central axis O3 direction may be shorter than the length of the pressing portion 74 in the central axis O3 direction. As shown in FIG. 26, the length of the reinforcing portion 77 in the central axis O3 direction may be the same as the length of the pressing portion 74 in the central axis O3 direction. As shown in FIG. 27, the regulating member 71 might not include a pressing portion 74. In any case, at least the reinforcing portion 77 engages with the edge of the distal-end opening 3a of the pressing tube 3, such that the minimum approaching distance between the clip 2 and the pressing tube 3 is restricted.

Another exemplary embodiment of the present disclosure will be described with reference to FIG. 28 to FIG. 34. In the following description, the same reference signs will be designated to the configurations common to those already described, and duplicate description will be omitted. A cartridge system 100B according to the present embodiment has a different configuration of the regulating member and the like as compared with the cartridge system 100 described above.

The cartridge system 100B has a clip unit 1B and a cartridge 5B for accommodating the clip unit 1B. The cartridge 5B includes a case 6B, a regulating member 7B, and a clamping member 9. The case 6B has the same configuration as the case 6 according to the embodiment shown in FIG. 1 to FIG. 27, and further includes a recovery region 64 in the accommodation region 6S.

Figure 28:
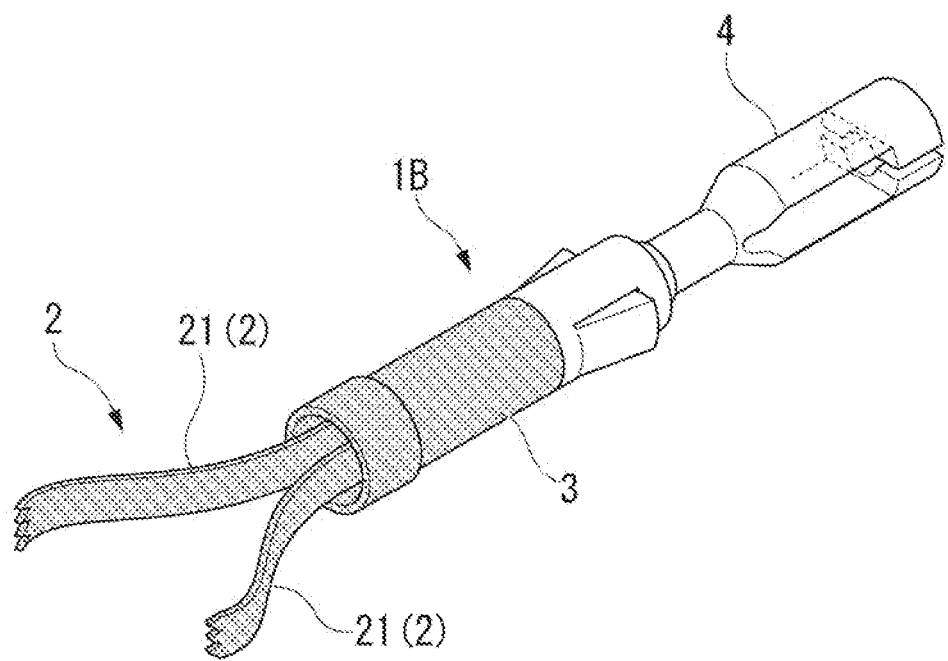
FIG. 28 is a perspective view showing a clip unit of a cartridge system according to an exemplary embodiment of the present disclosure.

FIG. 28 is a perspective view of the clip unit 1B.

The clip unit 1B includes the clip 2, the pressing tube 3, and the connecting member 4. Since the clip unit 1B is used together with the high-frequency treatment device, the metal portion (the clip 2 and a part of the pressing tube 3) is coated with an insulating coating or the like. In the cartridge 5B in which the clip unit 1B is accommodated, it is desirable that the covered portion does not come into contact with the cartridge 5B.

Figure 29:
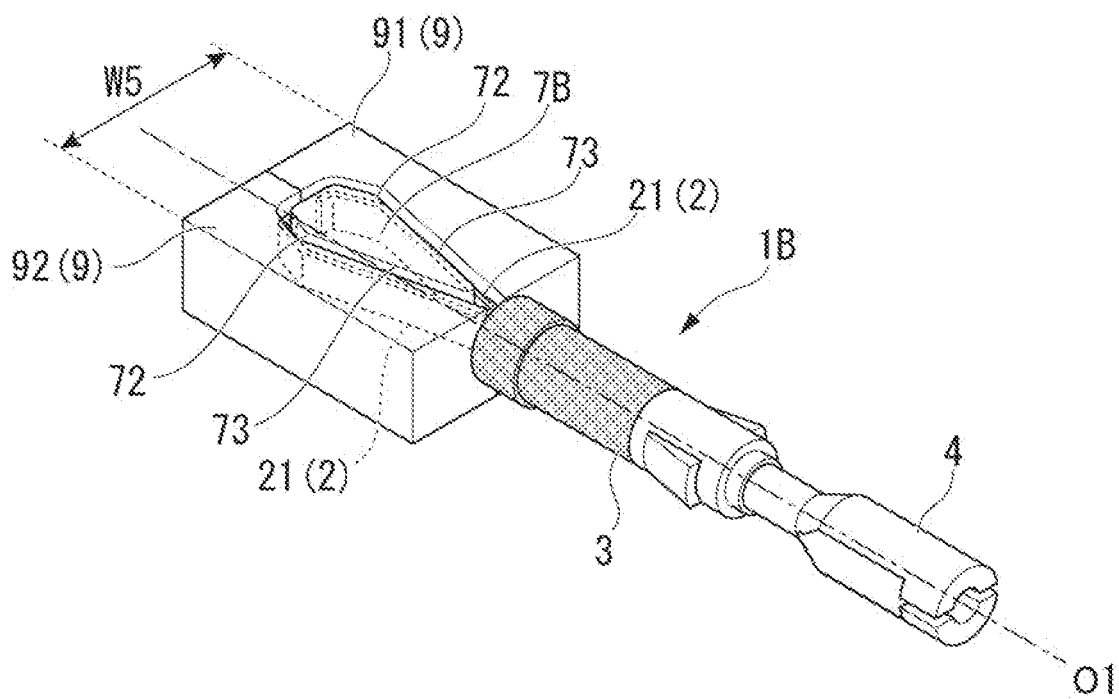
FIG. 29 is a perspective view showing a regulating member, a clamping member, and the clip unit of the cartridge system.
Figure 30:
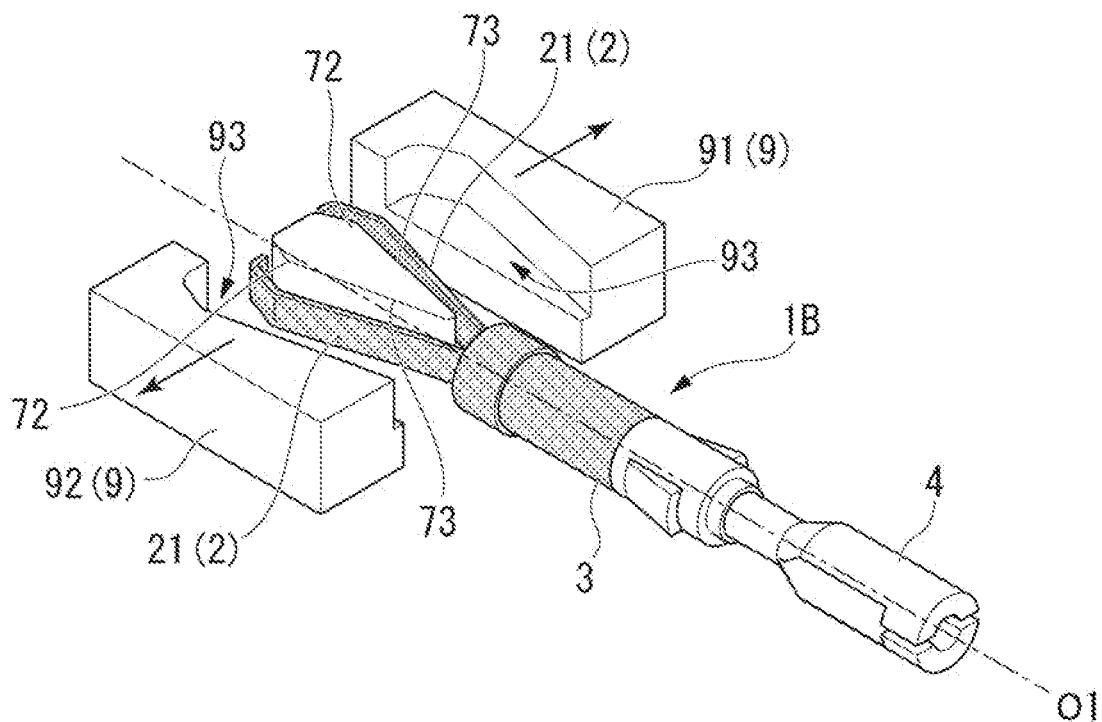
FIG. 30 is a perspective view showing the regulating member, the clamping member, and the clip unit of the cartridge system.

FIG. 29 and FIG. 30 are perspective views of the regulating member 7B, the clamping member 9, and the clip unit 1B. The regulating member 7B includes the protruding portion 72 and the tapered portion 73. The protruding portion 72 of the regulating member 7B has a shorter length in the protruding direction P as compared with the regulating member 7.

The clamping member 9 includes a first clamping member 91 and a second clamping member 92. The first clamping member 91 and the second clamping member 92 sandwich the pair of arms 21 in the open-close direction P of the pair of arms 21. As shown in FIG. 30, the first clamping member 91 and the second clamping member 92 are formed in a rectangular box shape, and have a recess portion 93 for accommodating the pair of arms 21 and the regulating member 7B.

Figure 31:
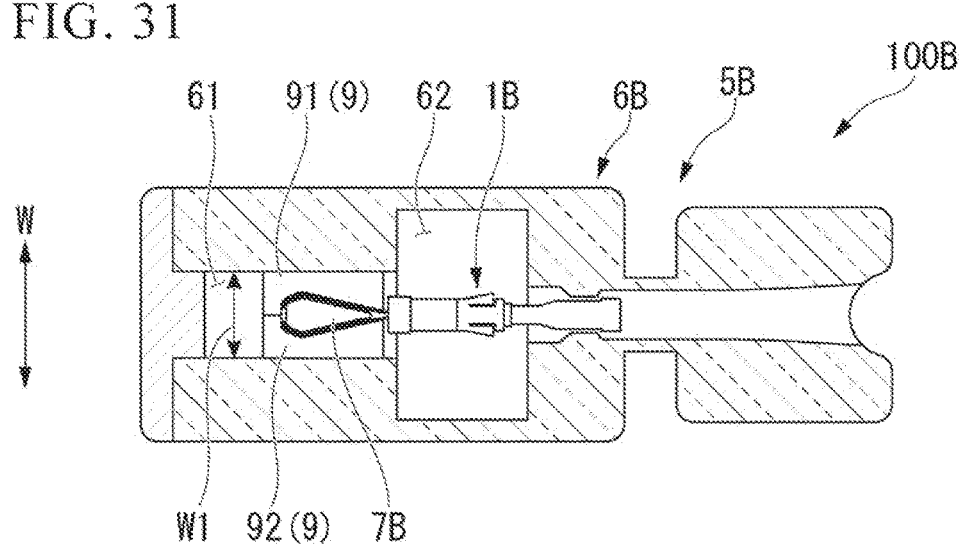
FIG. 31 is a cross-sectional view showing the clip unit that is accommodated in the cartridge of the cartridge system.

FIG. 31 is a cross-sectional view showing the clip unit 1B accommodated in the cartridge 5B.

The pair of arms 21 are accommodated in the first region 61 in a state of grasping the regulating member 7B and being clamped by the clamping members 9. The clip unit 1B is accommodated in the accommodation region 6S such that the open-close direction P of the pair of arms 21 coincides with the width direction W of the case 6B. The length W5 of the clamping member 9 sandwiching the pair of arms 21 in the width direction W (see FIG. 29) is substantially equal to the length W1 in the width direction W of the first region 61.

Figure 32:
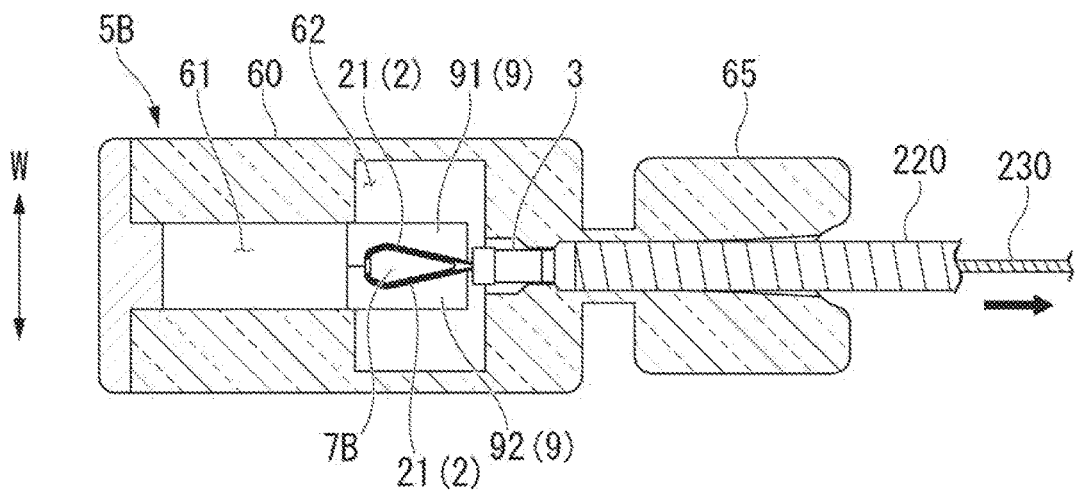
FIG. 32 is a view showing a method of loading the clip unit using the cartridge.
Figure 33:
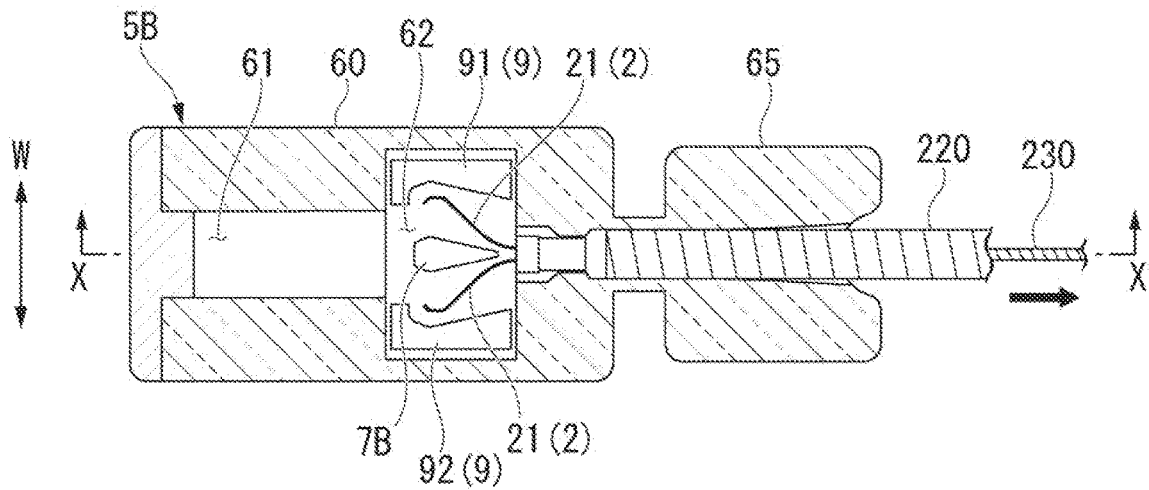
FIG. 33 is a view showing a method of loading the clip unit using the cartridge.

Next, the operations of the cartridge system 100B will be described. FIG. 32 to FIG. 33 are views for explaining a method of loading the clip unit 1B into the clip introduction device 200 by using the cartridge 5B.

As shown in FIG. 32, the user pulls the operation wire 230 as in the embodiment shown in FIG. 1 to FIG. 27. The clip 2 of the clip unit 1B is pulled toward the proximal-end side by the connecting member 4 connected to the arrowhead hook portion 231. The regulating member 7B moves in the first region 61 of the accommodation region 6S in a state of being in contact with the pair of arms 21. Since the pair of arms 21 and the clamping member 9 engage with the edge of the distal-end opening 3a of the pressing tube 3, the pressing tube 3 is also pulled toward the proximal-end side together with the clip 2.

The pair of arms 21 pushes the clamping member 9 outward in the width direction W by the self-expanding force. As a result, in the first region 61, the clamping member 9 comes into contact with the case main body 60 in the open-close direction P. It is possible to suitably prevent the clip 2 from being drawn into the internal space of the pressing tube 3 and being locked in the closed state by the pressing tube 3 due to the friction force generated by the clamping member 9 and the case main body 60 coming into contact with each other.

When the clip 2 is pulled toward the proximal-end side, the clamping member 9 engages with the edge of the distal-end opening 3a of the pressing tube 3, such that the minimum approaching distance between the clip 2 and the pressing tube 3 is restricted. Also according to this configuration, it is possible to suitably prevent the clip 2 that is pulled toward the proximal-end side by the connecting member 4 from being drawn into the internal space of the pressing tube 3 and being locked in the closed state by the pressing tube 3.

As shown in FIG. 33, the user further pulls the operation wire 230 to pull the regulating member 7B and the clamping member 9 to the second region 62. The length W2 of the second region 62 in the width direction W is larger than the open width W3 of the pair of arms 21 in the open state and the length W5 of the clamping member 9 in the width direction W (see FIG. 29). Therefore, in the second region 62, the regulating member 7B is not grasped by the pair of arms 21. Also, in the second region 62, the clamping member 9 is pushed to move to the outside in the width direction W by the pair of arms 21, and does not clamp the pair of arms 21.

Figure 34:
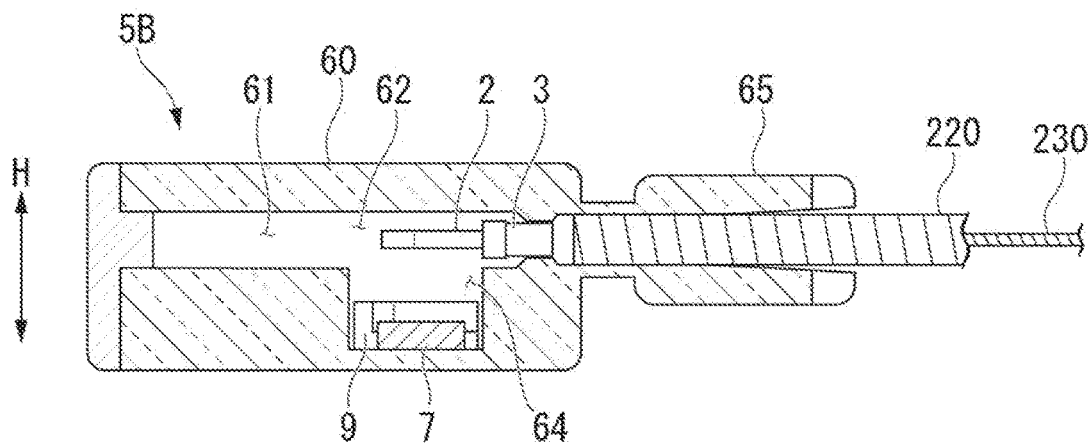
FIG. 34 is a cross-sectional view along the line X-X in FIG. 33.

FIG. 34 is a cross-sectional view taken along the line X-X of FIG. 33.

The regulating member 7B and the clamping member 9 separated from the pair of arms 21 fall into the recovery region 64 formed at the lower side in the height direction H. The user further pulls the operating wire 230. The clip 2 pulled to the proximal-end side is drawn into the sheath 220 while being drawn into the internal space of the pressing tube 3. The clip 2 may be pulled into the sheath 220 without being pulled into the internal space of the pressing tube 3. As a result, loading of the clip unit 1B into the clip introduction device 200 is completed.

According to the cartridge system 100B of the present embodiment, it is easy for the clip unit 1 to be loaded into the clip introduction device 200 without the clip 2 having the self-expanding force being locked in the closed state by the pressing tube 3. Furthermore, since the clip unit 1 does not come into contact with the cartridge 5B in the open-close direction P, it is easy for the clip unit 1 to be loaded into the clip introduction device 200 without peeling the coating.

Although the present embodiment of the present invention has been described in detail with reference to the drawings, the specific configuration is not limited to this embodiment, and includes design changes and the like within a range that does not deviate from the scope of the present invention. In addition, the components shown in the above-described embodiments and modification examples can be appropriately combined and configured.

Another exemplary embodiment of the present invention will be described with reference to FIG. 35 to FIG. 39. In the following description, the same reference signs will be designated to the configurations common to those already described, and duplicate description will be omitted. A cartridge system 100C according to the present embodiment has a different configuration of the regulating member and the like as compared with the cartridge system 100 described above.

The cartridge system 100C includes the clip unit 1 and a cartridge 5C for accommodating the clip unit 1. The cartridge 5C includes a case 6C and a regulating member 7C.

Figure 35:
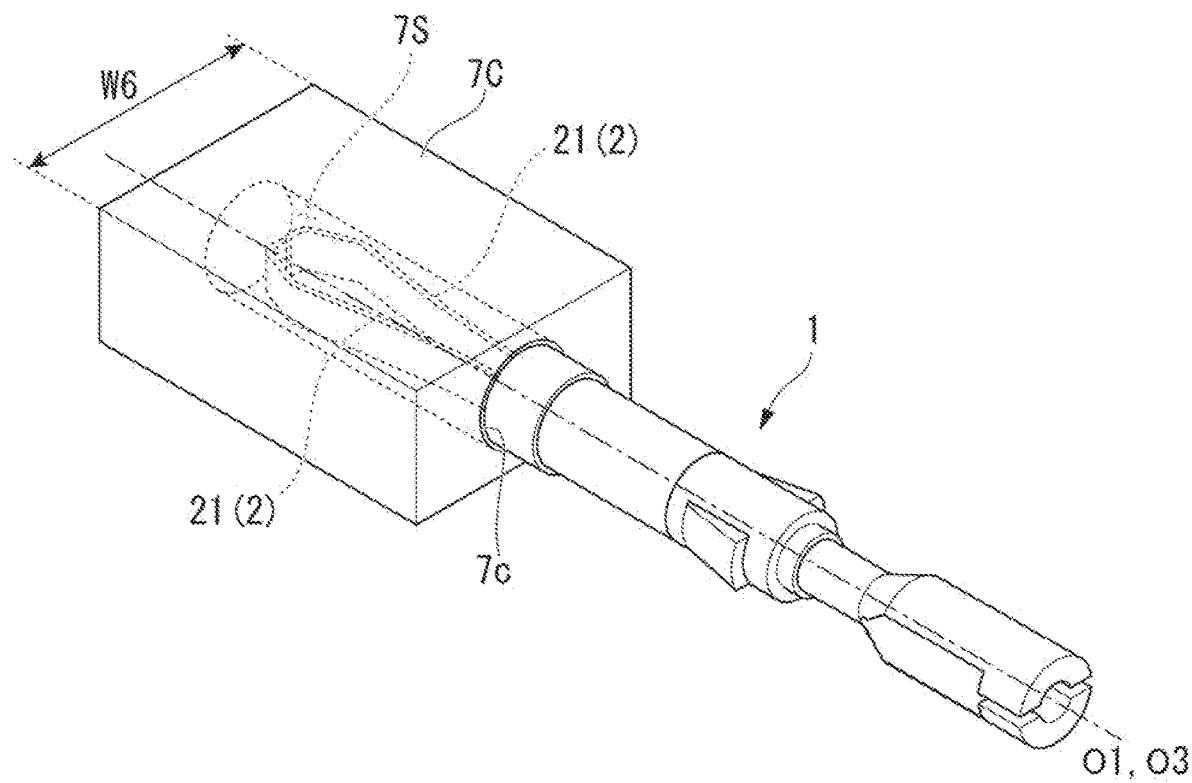
FIG. 35 is a perspective view showing a regulating member and a clip unit of a cartridge system according to an exemplary embodiment of the present disclosure.

FIG. 35 is a perspective view of the regulating member 7C and the clip unit 1.

The regulating member 7C is formed in a rectangular box shape. An internal space 7S is formed in the regulating member 7C along the central axis O3 of the regulating member 7C. The internal space 7S has an opening 7c on the proximal-end side. The internal space 7S is a space capable of accommodating the distal end portions of the pair of arms 21 in the closed state.

Figure 36:
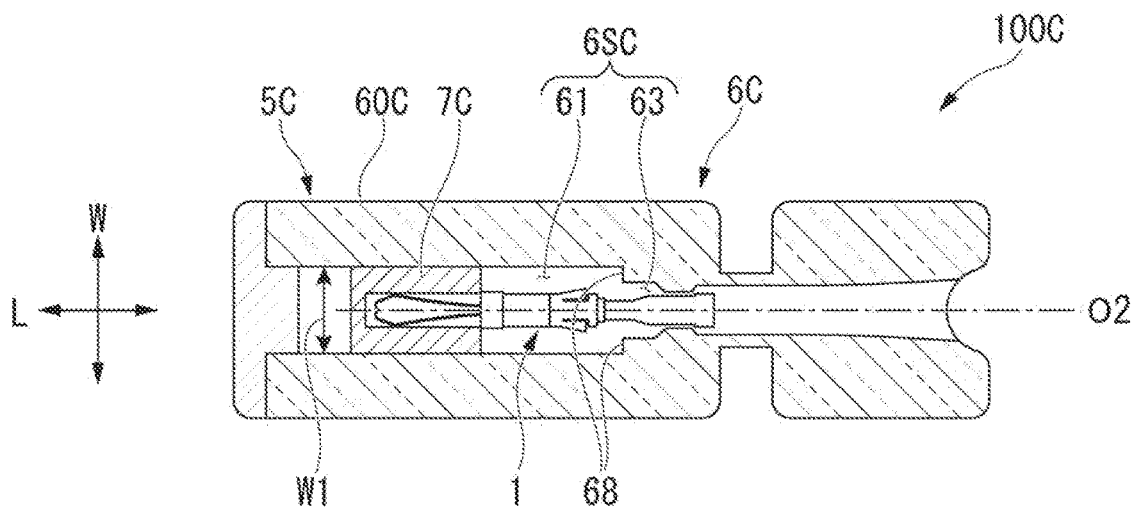
FIG. 36 is a cross-sectional view of the cartridge accommodating the clip unit.

FIG. 36 is a cross-sectional view showing the cartridge 5C in which the clip unit 1 is accommodated.

The case 6C has a case main body 60C, a squeezing portion 65, and a sheath connecting portion 66. The case main body 60C is formed with an accommodation region 6SC in which the clip unit 1 is movably accommodated in the longitudinal direction L. The accommodation region 6SC does not include the second region 62; however, the accommodation region 6SC includes the first region 61 and the folding portion 63. The accommodation region 6SC includes an abutting portion 68 between the first region 61 and the folding portion 63. The abutting portion 68 is a plane substantially orthogonal to the central axis O2.

The pair of arms 21 are accommodated in the first region 61 with the distal-end portions accommodated in the internal space 7S. The clip unit 1 is accommodated in the accommodation region 6SC such that the open-close direction P of the pair of arms 21 coincides with the width direction W of the case 6B. The length W6 of the regulating member 7C in the width direction W (see FIG. 35) is substantially equal to the length W1 of the first region 61 in the width direction W.

Figure 37:
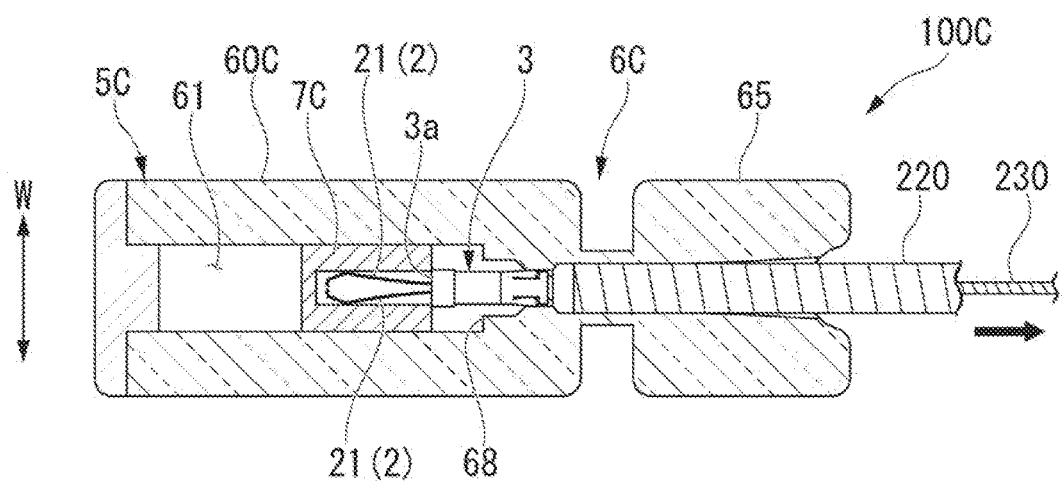
FIG. 37 is a view showing a method of loading the clip unit using the cartridge.
Figure 38:
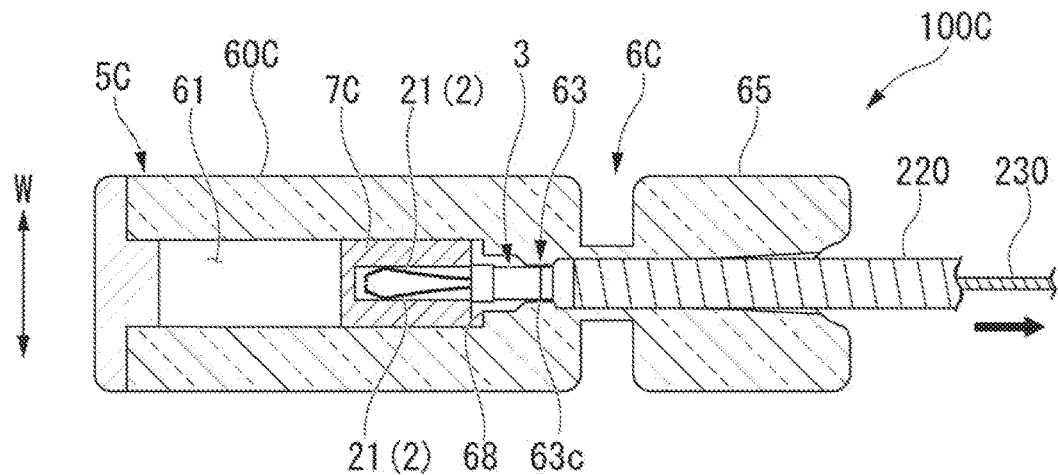
FIG. 38 is a view showing the method of loading the clip unit using the cartridge.
Figure 39:
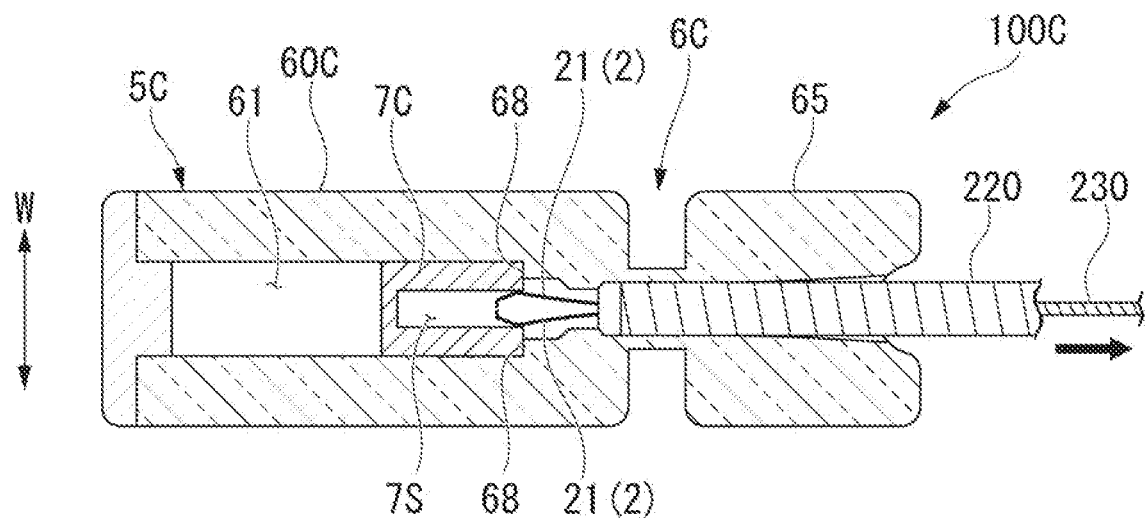
FIG. 39 is a view showing the method of loading the clip unit using the cartridge.

Next, the operations of the cartridge system 100C will be described. FIG. 37 to FIG. 39 are views showing a method of loading the clip unit 1 into the clip introduction device 200 using the cartridge 5C.

As shown in FIG. 37, the user pulls the operation wire 230 as in the embodiment shown in FIG. 1 to FIG. 27. The clip 2 of the clip unit 1 is pulled toward the proximal-end side by the connecting member 4 connected to the arrowhead hook portion 231. Since the pair of arms 21 are biased to open in the open-close direction P, the pair of arms 21 come into close contact with the regulating member 7C in the internal space 7S. As a result, the regulating member 7C is pulled toward the proximal end side together with the clip 2 and the pressing tube 3. The regulating member 7C moves in the accommodation region 6SC in contact with the pair of arms 21. Since the regulating member 7C engages with the edge of the distal-end opening 3a of the pressing tube 3, the pressing tube 3 is also pulled toward the proximal-end side together with the clip 2.

The regulating member 7C comes into contact with the case main body 60C in the open-close direction P. It is possible to suitably prevent the clip 2 from being drawn into the internal space of the pressing tube 3 and being locked to the closed state by the pressing tube 3 due to the friction force generated by the regulating member 7C coming into contact with the case main body 60C.

When the clip 2 is pulled toward the proximal-end side, the regulating member 7C engages with the edge of the distal-end opening 3a of the pressing tube 3 such that the minimum approaching distance between the clip 2 and the pressing tube 3 is restricted. According to this configuration, it is possible to suitably prevent the clip 2 that is pulled toward the proximal-end side by the connecting member 4 from being drawn into the internal space of the pressing tube 3 and being locked in the closed state by the pressing tube 3.

As shown in FIG. 38, the user further pulls the operation wire 230 such that the pressing tube 3 passes through the folding portion 63. The pressing tube 3 slides the reduced-diameter portion 63c from the distal-end end side toward the proximal-end side, and the protruding-recessing wing 31 of the pressing tube 3 is accommodated inside the pressing tube main body 30.

As shown in FIG. 39, the user further pulls the operation wire 230 such that the regulating member 7C comes into contact with the abutting portion 68. By the user further pulling the operation wire 230, the user leaves the regulating member 7C in contact with the abutting portion 68 in the accommodation region 6SC, and pulls the clip 2 into the internal space of the pressing tube 3 and into the sheath 220.

According to the cartridge system 100C of the present embodiment, the clip unit 1 can be easily loaded into the clip introduction device 200 without the clip 2 having the self-expanding force being locked in the closed state by the pressing tube 3. Further, the clip unit 1 can be easily loaded into the clip introduction device 200 without making the clip unit 1 into contact with the cartridge 5C in the open-close direction P.

Although the present embodiment of the present invention has been described in detail with reference to the drawings, the specific configuration is not limited to this embodiment, and includes design changes and the like within a range that does not deviate from the scope of the present invention. In addition, the components shown in the above-described embodiments and modification examples can be appropriately combined and configured.

Another exemplary embodiment of the present disclosure will be described with reference to FIG. 40 to FIG. 48. In the following description, the same reference signs will be designated to the configurations common to those already described, and duplicate description will be omitted. The cartridge system 100D according to the present embodiment has a different configuration in the regulating member and the like as compared with the cartridge system 100 described above.

The cartridge system 100D includes the clip unit 1 and the cartridge 5D that accommodates the clip unit 1. The cartridge 5D includes a case 6D and a regulating member 7D. The case 6D has the same configuration as the case 6 according to the embodiment shown in FIG. 1 to FIG. 27, and further includes a recovery region 64 in the accommodation region 6S.

Figure 40:
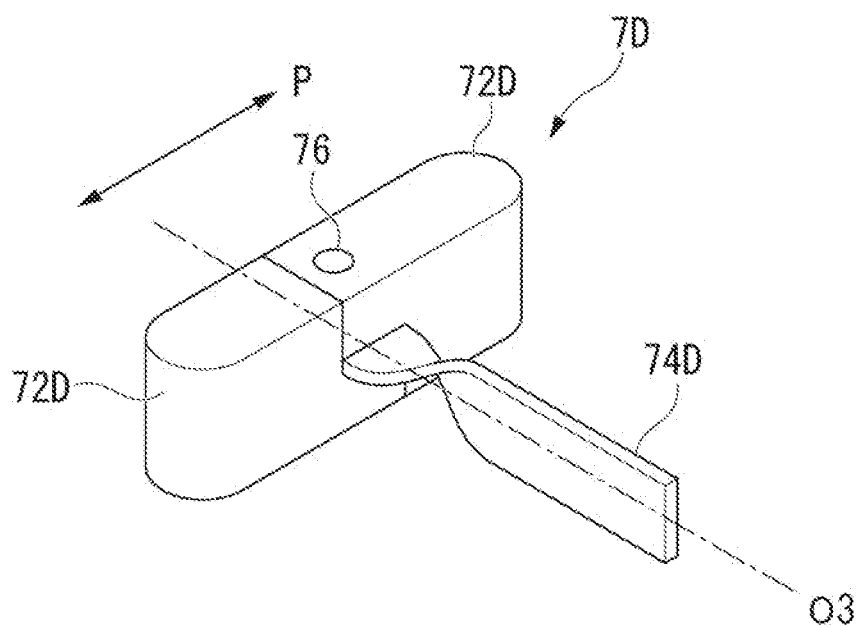
FIG. 40 is a perspective view showing a regulating member of a cartridge system according to an exemplary embodiment of the present disclosure.
Figure 41:
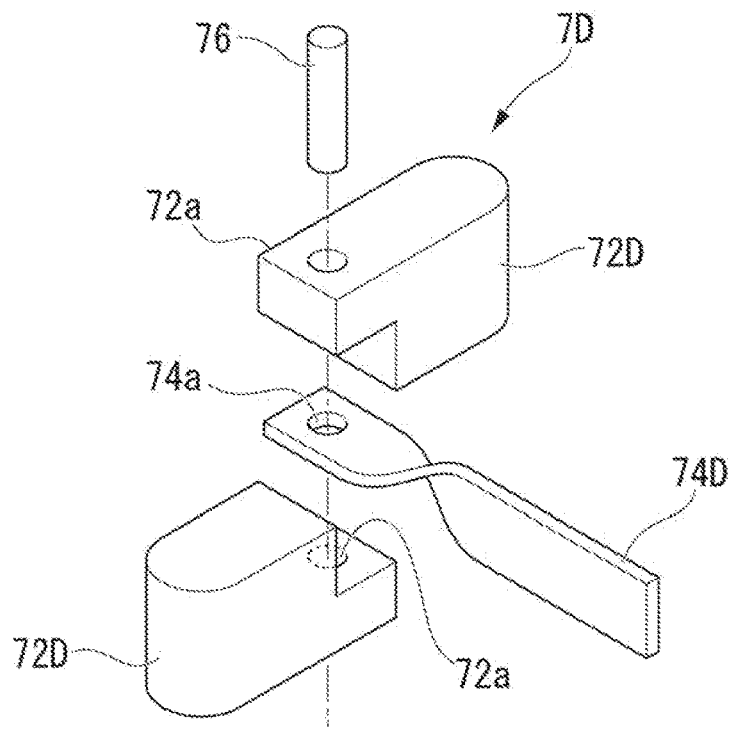
FIG. 41 is an exploded view showing the regulating member.

FIG. 40 is a perspective view of the regulating member 7D. FIG. 41 is an exploded view showing the regulating member 7D.

The regulating member 7D includes a protruding portion 72D, a pressing portion 74D, and a stopper 76. The projecting portion 72D and the pressing portion 74D are separably connected by the stopper 76.

The protruding portion 72D is a member that protrudes in the protruding direction P. The protruding portions 72 are provided separately on both sides of the central axis O3. The protruding portions 72D are grasped by the first arm 211 and the second arm 212, respectively. As shown in FIG. 41, the separately provided protruding portions 72D are formed with through holes 72a through which the stopper 76 penetrates.

The pressing portion 74D is a plate-shaped member that regulates the minimum approaching distance between the clip 2 and the pressing tube 3 as in the pressing portion 74 according to the first embodiment. The distal-end side of the pressing portion 74D is twisted 90 degrees around the central axis O3 with respect to the proximal-end side. A through hole 74a through which the stopper 76 penetrates is formed in the vicinity of the distal end of the pressing portion 74D.

Figure 42:
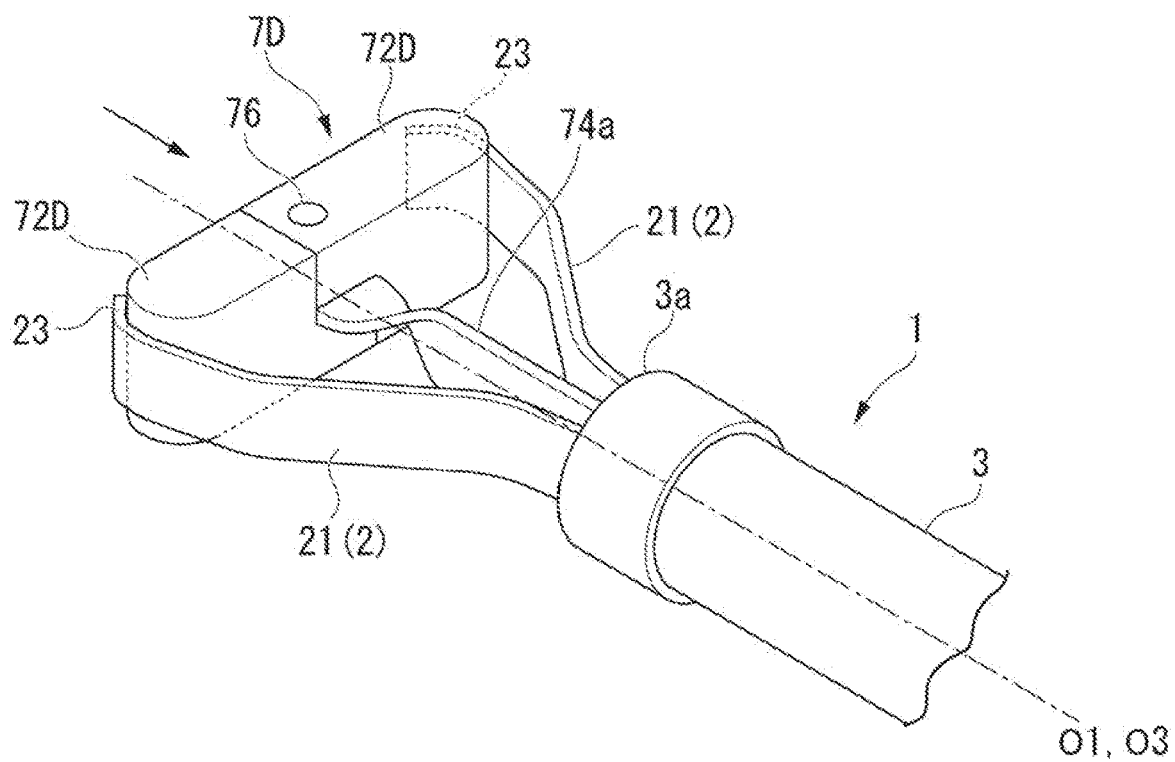
FIG. 42 is a perspective view showing the regulating member that is grasped by a pair of arms of the cartridge system.
Figure 43:
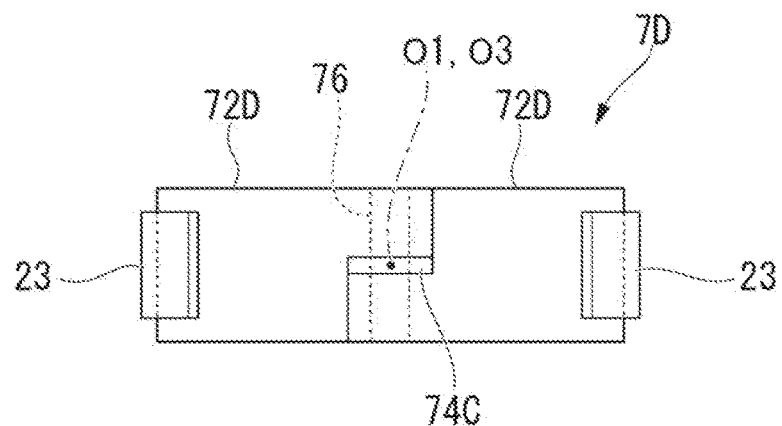
FIG. 43 is a front view showing the regulating member that is viewed from the front in in a central axis direction.

FIG. 42 is a perspective view showing the regulating member 7 grasped by the pair of arms 21. FIG. 43 is a front view showing the regulating member 7D as viewed from the front in the central axis O3 direction (in the direction indicated by the arrow in FIG. 42). The regulating member 7D is grasped by the clip 2 such that the central axis O3 substantially coincides with the central axis O1 of the clip unit 1.

Figure 44:
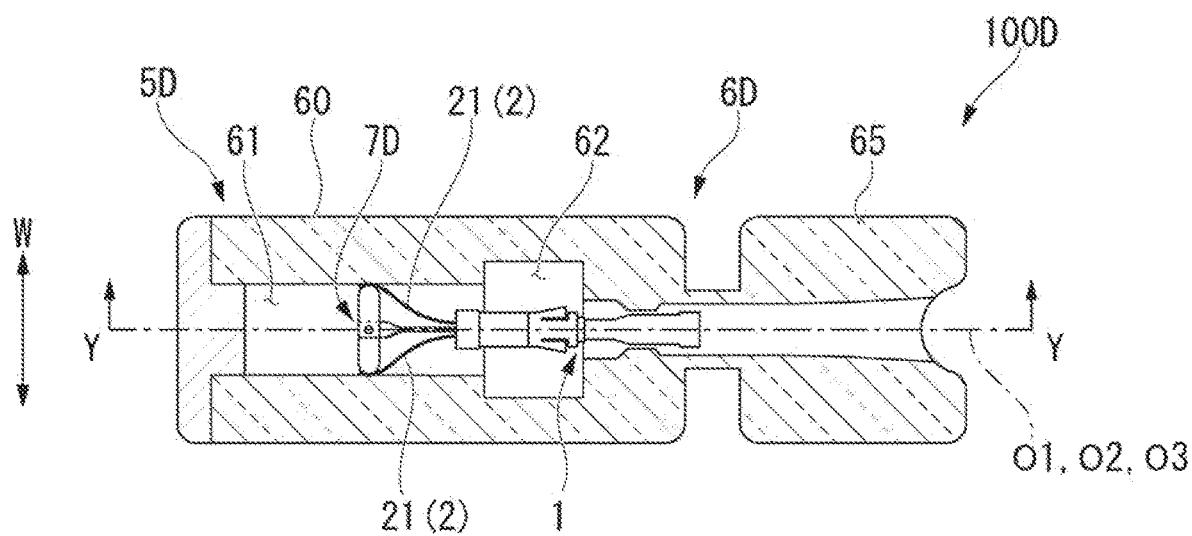
FIG. 44 is a cross-sectional view showing the cartridge accommodating the clip unit.

FIG. 44 is a cross-sectional view showing the cartridge 5D in which the clip unit 1 is accommodated.

The clip unit 1 is accommodated in the accommodation region 6S in the state in which the clip 2 grasps the regulating member 7D. At this time, it is desirable that the central axis O1 and the central axis O2 and the central axis O3 coincide with each other. The pair of arms 21 come into contact with the case main body 60 in the open-close direction P as in the first embodiment.

Figure 45:
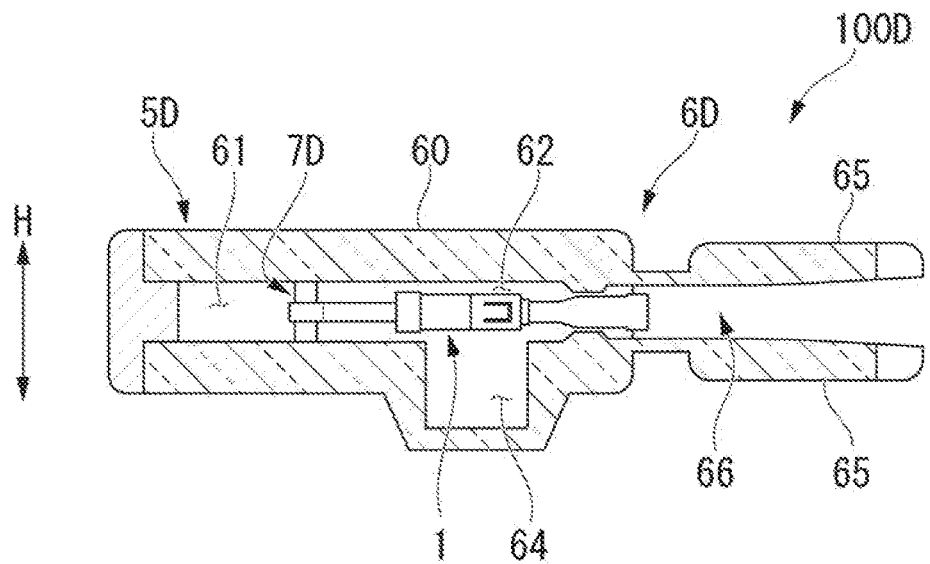
FIG. 45 is a cross-sectional view along the line Y-Y in FIG. 44.

FIG. 45 is a cross-sectional view taken along the line Y-Y of FIG. 44.

The case 6D further includes a recovery region 64 in the accommodation region 6S. The recovery region 64 is a space formed at the lower side in the height direction H of the second region 62 and can accommodate the regulating member 7D.

Figure 46:
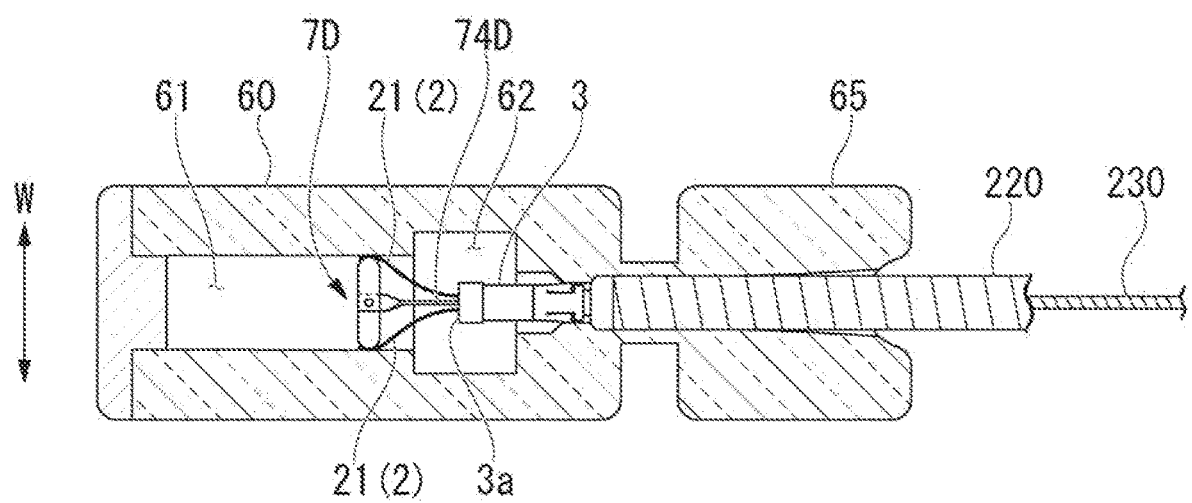
FIG. 46 is a view showing a method of loading the clip unit using the cartridge.
Figure 47:
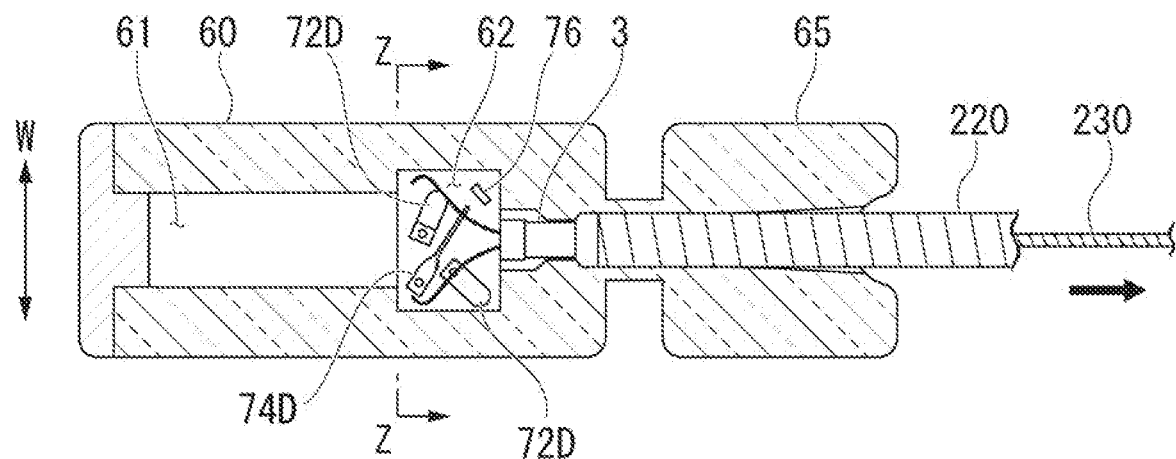
FIG. 47 is a view showing the method of loading the clip unit using the cartridge.
Figure 48:
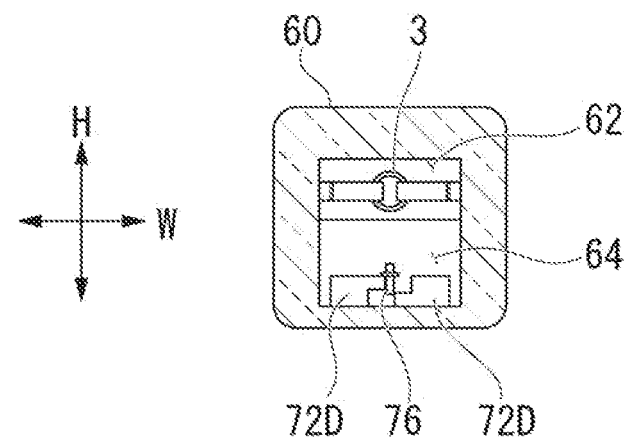
FIG. 48 is a cross-sectional view taken along a line Z-Z in FIG. 47.

Next, the operations of the cartridge system 100D will be described. FIG. 46 to FIG. 48 are views showing a method of loading the clip unit 1 into the clip introduction device 200 using the cartridge 5D.

As shown in FIG. 46, the user pulls the operation wire 230 as in the embodiment shown in FIG. 1 to FIG. 27. The clip 2 of the clip unit 1D is pulled toward the proximal-end side by the connecting member 4 connected to the arrowhead hook portion 231. The regulating member 7D moves in the first region 61 of the accommodation region 6S in a state of being in contact with the pair of arms 21. Since the pair of arms 21 engage with the edge of the distal-end opening 3*a* of the pressing tube 3, the pressing tube 3 is also pulled toward the proximal-end side together with the clip 2.

In the first region 61, the pair of arms 21 abut on the case main body 60 in the open-close direction P. It is possible to suitably prevent the clip 2 from being drawn into the internal space of the pressing tube 3 and being locked to the closed state by the pressing tube 3 due to the friction force generated by the pair of arms 21 coming into contact with the case main body 60.

When the clip 2 is pulled toward the proximal-end side, the pressing portion 74D of the regulating member 7D engages with the edge of the distal-end opening 3*a* of the pressing tube 3 such that the minimum approaching distance between the clip 2 and the pressing tube 3 is restricted. This configuration also makes it possible to suitably prevent the clip 2 that is pulled toward the proximal-end side by the connecting member 4 from being drawn into the internal space of the pressing tube 3 and being locked in the closed state by the pressing tube 3.

As shown in FIG. 47, the user further pulls the operation wire 230 to pull the regulating member 7D to the second region 62. The recovery region 64 is formed at the lower side in the height direction H of the second region 62. The regulating members 7D that are pulled to the second region 62 are separated from each other by the stopper 76 being pulled out.

FIG. 48 is a cross-sectional view taken along the line Z-Z of FIG. 47.

As shown in FIG. 48, the protruding portion 72D, the pressing portion 74D, and the stopper 76 are separated from each other to fall into the recovery region 64. By further pulling the operation wire 230, the user pulls the clip 2 into the sheath 220 while pulling the clip 2 into the internal space of the pressing tube 3.

According to the cartridge system 100D of the present embodiment, it is easy to load the clip unit 1 into the clip introduction device 200 without the clip 2 having the self-expanding force being locked in the closed state by the pressing tube 3.

Although the present embodiment of the present invention has been described in detail with reference to the drawings, the specific configuration is not limited to this embodiment, and includes design changes and the like within a range that does not deviate from the scope of the present invention. In addition, the components shown in the above-described embodiments and modification examples can be appropriately combined and configured.

Modification Example 4

In the above-described embodiment, the clip 2 has the first arm 211 and the second arm 212, however, the aspect of the clip 2 is not limited to this configuration. The clip 2 only has to include a plurality of arms that can be opened and closed, and the clip 2 may have four arms, for example.

Another exemplary embodiment of the present disclosure will be described with reference to FIG. 49 to FIG. 54. In the following description, the same reference signs will be given to the configurations common to those already described, and duplicate description will be omitted. The cartridge system according to the present embodiment is different from the cartridge system 100 in that the cartridge system according to the present embodiment includes a regulating member 7K instead of the regulating member 7.

Figure 49:
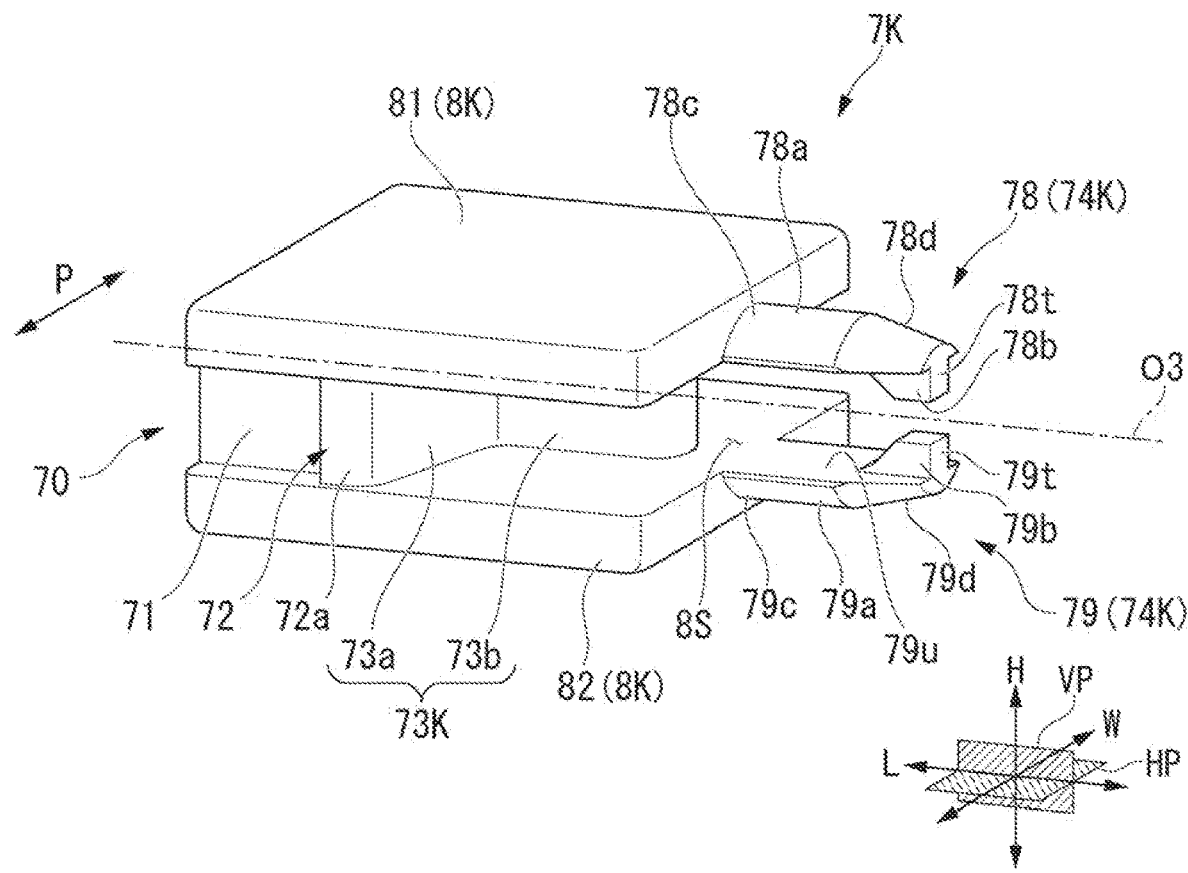
FIG. 49 is a perspective view showing a regulating member of a cartridge system according to an exemplary embodiment of the present disclosure.

FIG. 49 is a perspective view showing the regulating member 7K.

The regulating member 7K is movably accommodated in the first region 61 and the second region 62 together with the clip unit 1. The regulating member 7K is made of, for example, the same resin as that of the case 6. The regulating member 7K does not have to be made of the transparent resin as that of the case 6. As shown in FIG. 49, the regulating member 7K is formed in a shape symmetrical with respect to the vertical plane VP including the central axis O3.

The regulating member 7K includes an intermediate layer member 70, an assistance member 8K, and a pressing portion 74K. The intermediate layer member 70 has a distal-end portion 71, a protruding portion 72, and a tapered portion 73K. The distal-end portion 71, the protruding portion 72, and the taper portion 73K are arranged from the distal end to the proximal end along the central axis O3 direction of the regulating member 7K.

The regulating member 7K is grasped by the clip 2 such that the central axis O3 is substantially coincided with the central axis O1 of the clip unit 1 as in the regulating member 7 according to the first embodiment. The clip unit 1 is accommodated in the accommodation region 6S in the state in which the clip 2 grasps the regulating member 7K.

Figure 50:
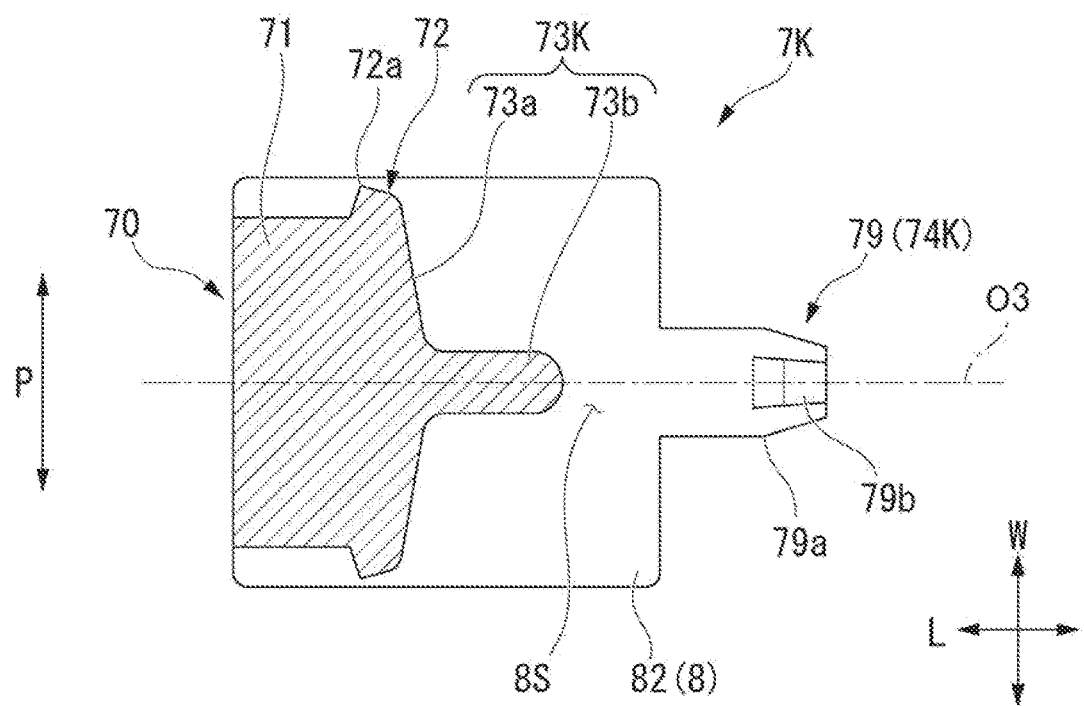
FIG. 50 is a cross-sectional view showing the regulating member.

FIG. 50 is a cross-sectional view showing the regulating member 7K.

The tapered portion 73K is a member formed in a tapered shape. The tapered portions 73K are provided on both sides of the central axis O3. A length of the tapered portion 73K in the protruding direction P is shorter than the protruding portion 72. The length of the tapered portion 73K in the protruding direction P becomes shorter from the distal-end side toward the proximal-end side.

The tapered portion 73K includes a first tapered portion 73*a* on the distal-end side and a second tapered portion 73*b* on the proximal-end side. An inclination of the first tapered portion 73*a* with respect to the central axis O3 is larger than that of the second tapered portion 73*b*.

Figure 51:
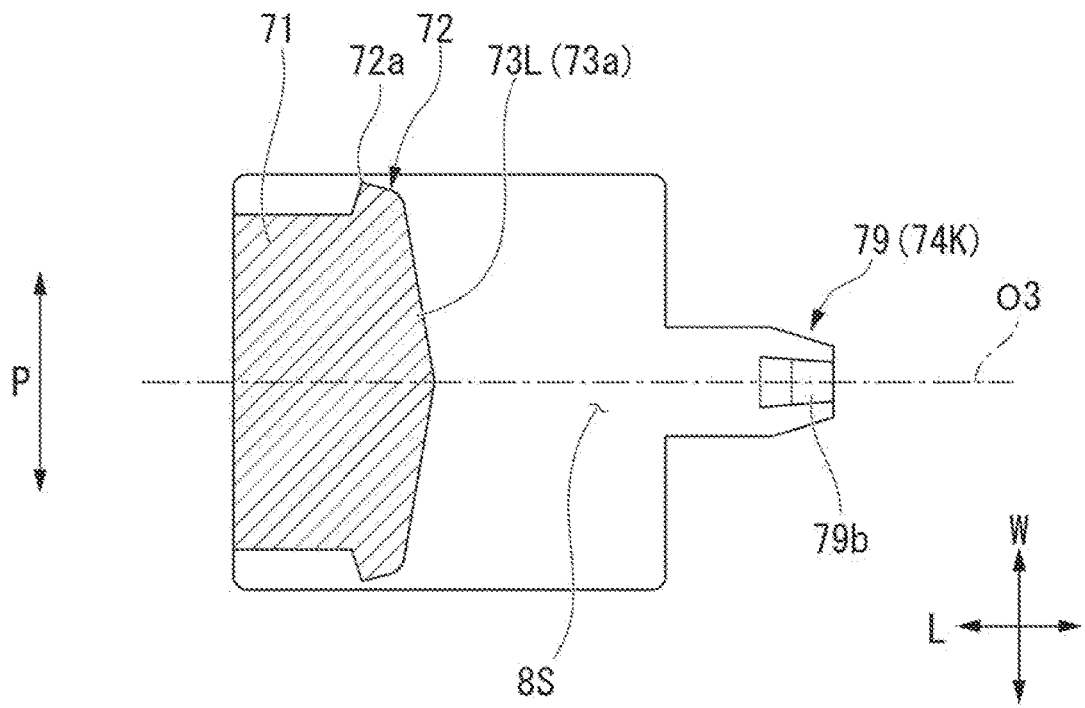
FIG. 51 is a cross-sectional view showing a modification example of a tapered portion of the regulating member.

FIG. 51 is a cross-sectional view showing a tapered portion 73L which is a modification example of the tapered portion 73K.

The tapered portion 73L has only the first tapered portion 73*a* and does not have the second tapered portion 73*b*. The taper portion 73L has a lower strength than that of the first taper portion 73*a* having the second taper portion 73*b*, however, it becomes more difficult for the tissue gasping portion 23 to be caught when the clip 2 is pulled.

The assistance member 8K adjusts the position of the intermediate layer member 70 in the height direction H such that the protruding portion 72 is grasped by the pair of arms 21. The assistance member 8K includes an upper layer assistance member 81 provided on one side (upper side) of the height direction H and a lower layer assistance member 82 provided on the other side (lower side) of the height direction H. The intermediate layer member 70 is sandwiched between the upper layer assistance member 81 and the lower layer assistance member 82 in the height direction H.

The pressing portion 74K is a plate-shaped member that regulates the minimum approaching distance between the clip 2 and the pressing tube 3. The pressing portion 74K is provided at the proximal end of the assistance member 8K. Since a part of the pressing portion 74K engages with the edge of the distal-end opening 3*a*, the entire pressing portion 74K cannot enter the internal space of the pressing tube 3 from the distal-end opening 3a. Therefore, even when the clip 2 is pulled in the direction approaching the pressing tube 3, the minimum approaching distance between the clip 2 and the pressing tube 3 is regulated.

Figure 52:
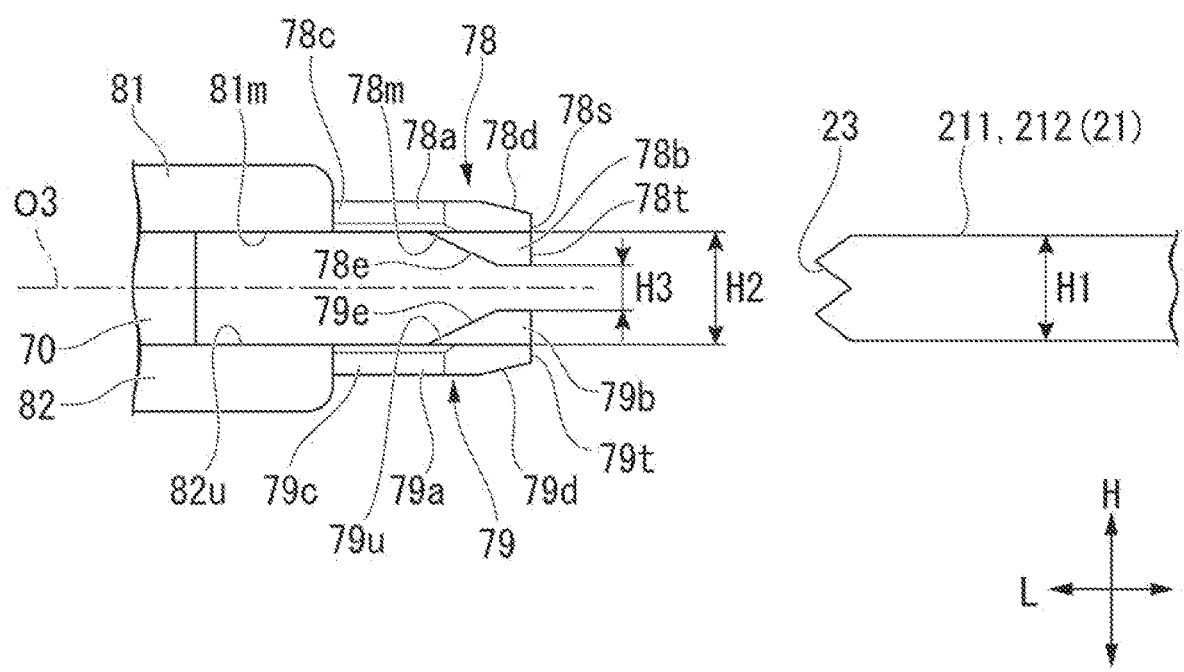
FIG. 52 is a side view showing the regulating member.

FIG. 52 is a side view showing the regulating member 7K.

The pressing portion 74K has a first pressing portion 78 and a second pressing portion 79 provided to face each other. The first pressing portion 78 is provided at the proximal end of the upper layer assistance member 81. The second pressing portion 79 is provided at the proximal end of the lower layer assistance member 82. The first pressing portion 78 and the second pressing portion 79 are formed in a shape symmetrical with respect to the horizontal plane HP including the central axis O3.

The first pressing portion 78 includes a first column portion 78a and a first convex portion 78b. The first column portion 78a is formed in a semi-cylindrical shape, and the distal end thereof is connected to the upper layer assistance member 81. The first column portion 78a is elastically deformed in the height direction H with a connecting portion with the upper layer assistance member 81 as a first fulcrum 78c. A lower surface 78m of the first column portion 78a forms the same plane as a lower surface 81m of the upper layer assistance member 81. An outer tapered surface 78d is provided on the upper surface of the first column portion 78a on the proximal-end side. A length of the outer tapered surface 78d with respect to the central axis O3 becomes shorter from the distal-end side toward the proximal-end side.

The first convex portion 78b is provided on the lower surface 78m on the proximal-end side of the first column portion 78a, and protrudes from the lower surface 78m of the first column portion 78a. The first convex portion 78b is formed in a shape symmetrical with respect to the vertical plane VP including the central axis O3. An inner tapered surface 78e is provided on the lower surface of the first convex portion 78b on the distal-end side. A normal line of the inner tapered surface 78e faces the distal-end side.

At the proximal ends of the first column portion 78a and the first convex portion 78b, a first end surface 78t whose normal direction coincides with the longitudinal direction L is formed.

The second pressing portion 79 has a second column portion 79a and a second convex portion 79b. The second column portion 79a is formed in a semi-cylindrical shape, and a distal end thereof is connected to the lower layer assistance member 82. The second column portion 79a is elastically deformed in the height direction H with a connecting portion with the lower layer assistance member 82 as a second fulcrum 79c. An upper surface 79u of the second column portion 79a forms the same plane as the upper surface 82u of the lower layer assistance member 82. An outer tapered surface 79d is provided on the lower surface of the second column portion 79a on the proximal-end side. A length of the outer tapered surface 79d with respect to the central axis O3 becomes shorter from the distal-end side toward the proximal-end side.

The second convex portion 79b is provided on the upper surface 79u on the proximal-end side of the second column portion 79a, and protrudes from the upper surface 79u of the second column portion 79a. The second convex portion 79b is formed in a shape symmetrical with respect to the vertical plane VP including the central axis O3. An inner tapered surface 79e is provided on the upper surface of the second convex portion 79b on the distal-end side. A normal line of the inner tapered surface 79e faces the distal-end side.

At the proximal ends of the second column portion 79a and the second convex portion 79b, a second end surface 79t whose normal direction coincides with the longitudinal direction L is formed.

Compared to the regulating member 7 according to the above embodiment as shown in FIG. 24, a portion of the regulating member 7K being in contact with the pair of arms 21 (the first convex portion 78b and the second convex portion 79b) is wide in the width direction W. Therefore, when the connecting member 4 and the arrowhead hook portion 231 are connected, it is possible to suitably prevent the connecting member 4 from being displaced from the central axis O2.

As shown in FIG. 52, the length H1 of the first arm 211 and the second arm 212 in the height direction H is shorter than the length H2 between the lower surface 81m of the upper layer assistance member 81 and the upper surface 82u of the lower layer assistance member 82 in the height direction H. Further, the length H1 is longer than the length H3 between the first convex portion 78b and the second convex portion 79b in the height direction H.

As shown in FIG. 49 and FIG. 50, the regulating member 7K includes an internal space 8S penetrating in the width direction W between the intermediate layer member 70 and the first convex portion 78b and the second convex portion 79b in the longitudinal direction L.

Next, the operations of the cartridge system according to the present embodiment will be described.

The user pulls the operation wire 230 so as to load the clip unit 1 into the clip introduction device 200, similarly to in the embodiment described with respect to FIG. 1 to FIG. 27. Since the first end surface 78t and the second end surface 79t of the pressing portion 74K of the regulating member 7K engage with the edge of the distal-end opening 3a of the pressing tube 3, the minimum approaching distance between the clip 2 and the pressing tube 3 is regulated.

The user further pulls the operation wire 230 to pull the regulating member 7K to the second region 62. The length W2 of the second region 62 in the width direction W is larger than the open width W3 of the pair of arms 21 in the open state. Therefore, the regulating member 7K is not grasped by the pair of arms 21 in the second region 62.

The user further pulls the operation wire 230. The clip 2 is separated from the regulating member 7K and pulled toward the proximal-end side. In the regulating member 7K, a tapered portion 73K is formed on the proximal-end side of the protruding portion 72 that is grasped by the pair of arms 21. Therefore, when the regulating member 7K is pulled toward the proximal-end side, it is difficult for the pair of arms 21 to be caught by the regulating member 7K.

The user further pulls the operation wire 230. Since the pair of arms 21 do not grasp the regulating member 7K, the minimum approaching distance between the clip 2 and the pressing tube 3 is not regulated. The pair of arms 21 are pulled toward the proximal-end while being closed.

The regulating member 7K has the internal space 8S penetrating in the width direction W. Therefore, when the pair of arms 21 pass through the internal space 8S, the pair of arms 21 are closed to come into contact with each other. It is desirable that the internal space 8S is large enough for the pair of arms 21 to be closed. For example, if the length of the internal space 88 in the longitudinal direction L is not sufficiently long, the pair of arms 21 that are closed may grasp the first convex portion 78b and the second convex portion 79b and do not separate from them.

Figure 53:
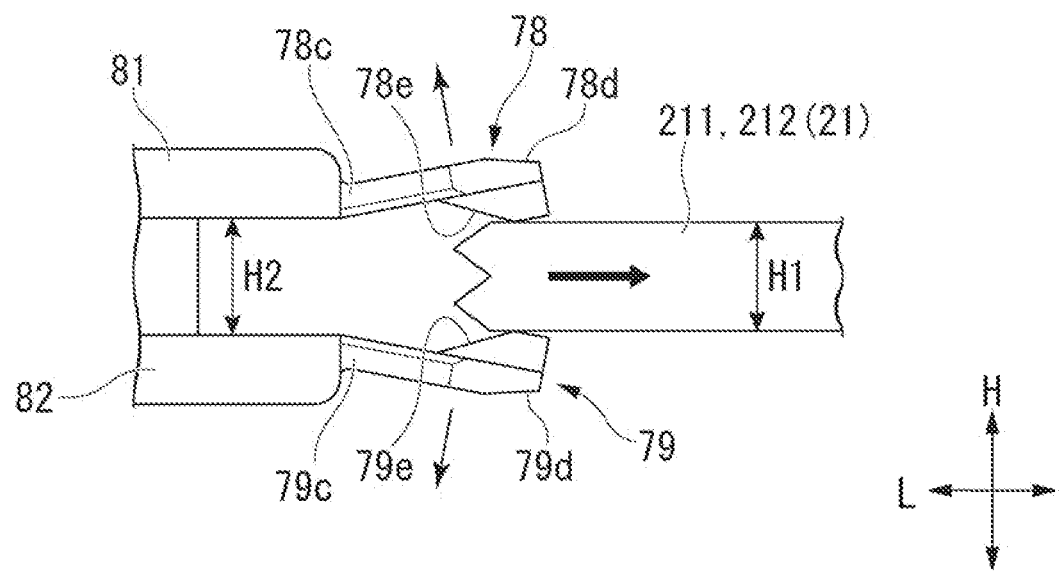
FIG. 53 is a side view showing a pair of arms passing through a pressing portion of the regulating member.

FIG. 53 is a side view showing the pair of arms 21 passing through the pressing portion 74K.

The length H1 of the pair of arms 21 in the height direction H1 is larger than the length H3 in the height direction H between the first convex portion 78b and the second convex portion 79b. Therefore, the pair of arms 21 in the closed state come into contact with the first convex portion 78b and the second convex portion 79b by being pulled.

The pair of arms 21 are further pulled to push away the first pressing portion 78 and the second pressing portion 79 such that the first pressing portion 78 and the second pressing portion 79 are moved in a direction away from each other. Specifically, the tissue grasping portion 23 of the pair of arms 21 makes the first pressing portion 78 to be elastically deformed upward around the first fulcrum 78c as a center. Since the tissue grasping portion 23 of the pair of arms 21 comes into contact with the inner tapered surface 78e, it is easy for the first pressing portion 78 to be elastically deformed upward. Further, the tissue grasping portion 23 of the pair of arms 21 makes the second pressing portion 79 to be elastically deformed downward around the second fulcrum 79c as a center. Since the tissue grasping portion 23 of the pair of arms 21 comes into contact with the inner tapered surface 79e, it is easy for the second pressing portion 79 to be elastically downward.

The regulating member 7K can definitely make the pair of arms 21 to pass therethrough by elastically deforming the pressing portion 74K, and it is possible to prevent the pair of arms 21 from grasping the regulating member 7K and being unable to be separated from each other in comparison with the regulating member 7 according to the embodiment shown in FIG. 1 to FIG. 27.

Figure 54:
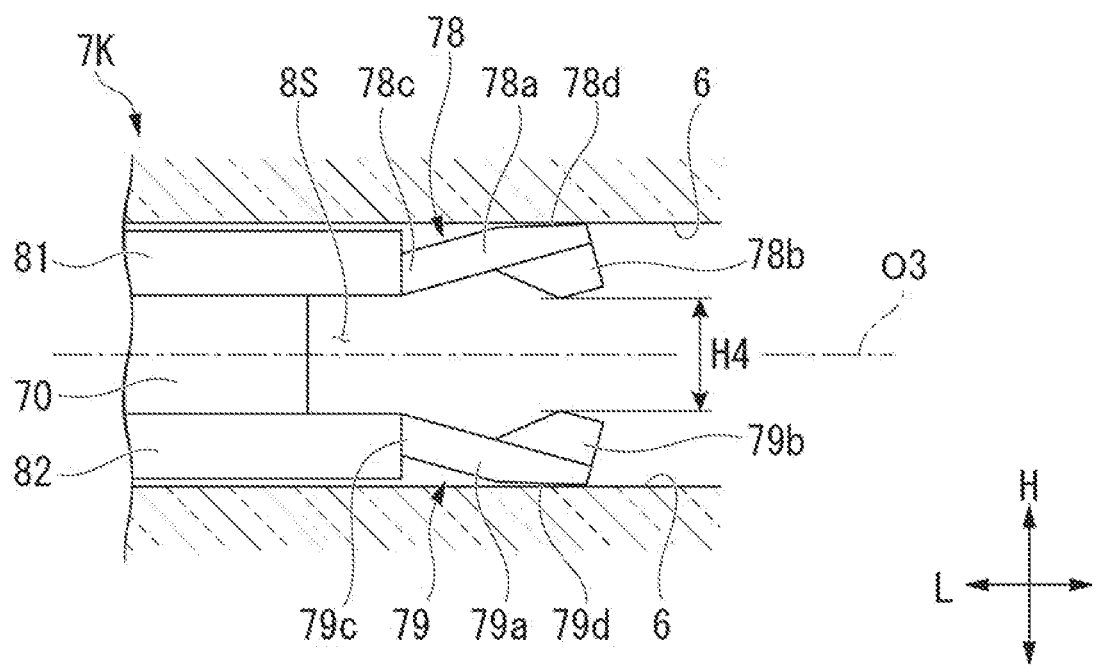
FIG. 54 is a side view showing the regulating member in which the pressing portion is elastically deformed.

FIG. 54 is a side view showing the regulating member 7K in which the pressing portion 74K is elastically deformed.

Since the first pressing portion 78 has the outer tapered surface 78d on the upper surface, the first pressing portion 78 can be elastically deformed until the outer tapered surface 78d comes into contact with the case 6. Further, since the second pressing portion 79 has the outer tapered surface 79d on the lower surface, the second pressing portion 79 can be elastically deformed until the outer tapered surface 79d comes into contact with the case 6. It is desirable that the length H4 between the first convex portion 78b and the second convex portion 79b in the height direction H is larger than the length H when the first pressing portion 78 and the second pressing portion 79 are elastically deformed until they come into contact with the case 6.

The first convex portion 78b and the second convex portion 79b are formed in a shape symmetrical with respect to the vertical plane VP including the central axis O3. Therefore, when the pair of arms 21 that are closed pass through the pressing portion 74K while making the pressing portion 74K to be elastically deformed, it is difficult for the pair of arms 21 to be caught by the pressing portion 74K.

The clip 2 pulled to the proximal-end side is pulled into the sheath 220 while being pulled into the internal space of the pressing tube 3. As a result, the loading of the clip unit 1 into the clip introducing device 200 is completed.

According to the cartridge system of the present embodiment, it is easy for the clip unit 1 to be loaded into the clip introduction device 200 without the clip 2 having the self-expanding force being locked in the closed state by the pressing tube 3.

Although the present embodiment of the present disclosure has been described in detail with reference to the drawings, the specific configuration is not limited to this embodiment, and includes design changes and the like within a range that does not deviate from the scope of the present invention. In addition, the components shown in the above-described embodiments and modification examples can be appropriately combined and configured.

Modification Example 5

Figure 55:
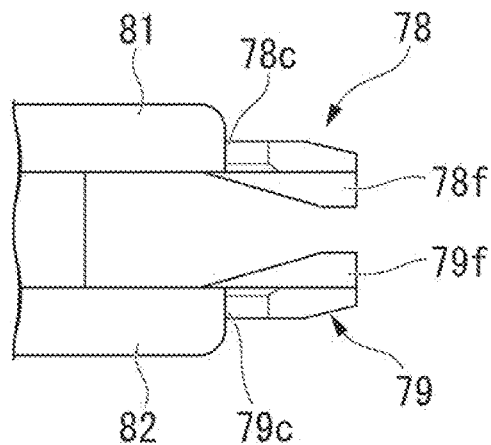
FIG. 55 is a side view showing a modification example of a first convex portion and a second convex of the regulating member.

FIG. 55 is a side view showing a first convex portion 78f and a second convex portion 79f as modification examples of the first convex portion 78b and the second convex portion 79b. The first convex portion 78f extends to the first fulcrum 78c of the first pressing portion 78 as compared with the first convex portion 78b. Therefore, even if the first pressing portion 78 is elastically deformed around the first fulcrum 78c, it is difficult for the first pressing portion 78 to be broken. The second convex portion 79f extends to the second fulcrum 79c of the second pressing portion 79 as compared with the second convex portion 79b. Therefore, even if the second pressing portion 79 is elastically deformed around the second fulcrum 79c, it is difficult for the second pressing portion 79 to be broken.

Modification Example 6

Figure 56:
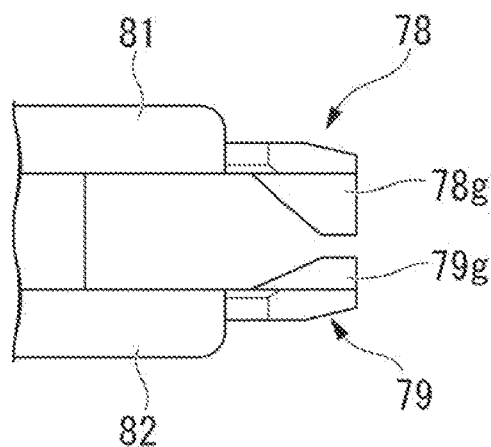
FIG. 56 is a side view showing another modification example of the first convex portion and the second convex of the regulating member.

FIG. 56 is a side view showing a first convex portion 78g and a second convex portion 79g as modification examples of the first convex portion 78b and the second convex portion 79b. The first convex portion 78g and the second convex portion 79g are not symmetrical with respect to the horizontal plane HP including the central axis O3. The length of the first convex portion 78g in the height direction H is longer than the length of the second convex portion 79g in the height direction H. The pressing portion 74K may be configured in any aspect as long as the pair of arms 21 can pass therethrough by elastically deforming the pressing portion 74K.

Modification Example 7

Figure 57:
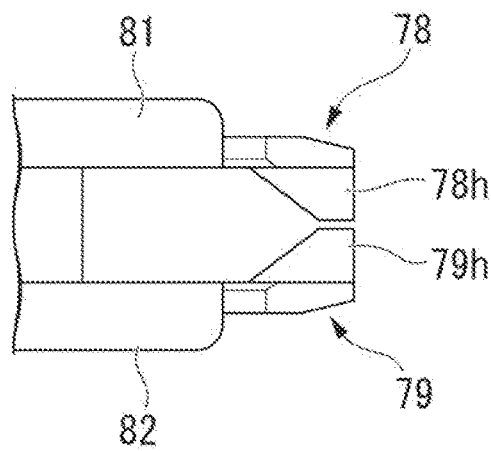
FIG. 57 is a side view showing further modification example of the first convex portion and the second convex of the regulating member.

FIG. 57 is a side view showing a first convex portion 78h and a second convex portion 79h as modification examples of the first convex portion 78b and the second convex portion 79b. The first convex portion 78h and the second convex portion 79h are adjacent to each other in the height direction H. The pressing portion 74K may be configured in any aspect as long as the pair of arms 21 can pass therethrough by elastically deforming the pressing portion 74K. A pair of arms 21 may be able to pass therethrough by plastically deforming the pressing portion 74K.

Modification Example 8

Figure 58:
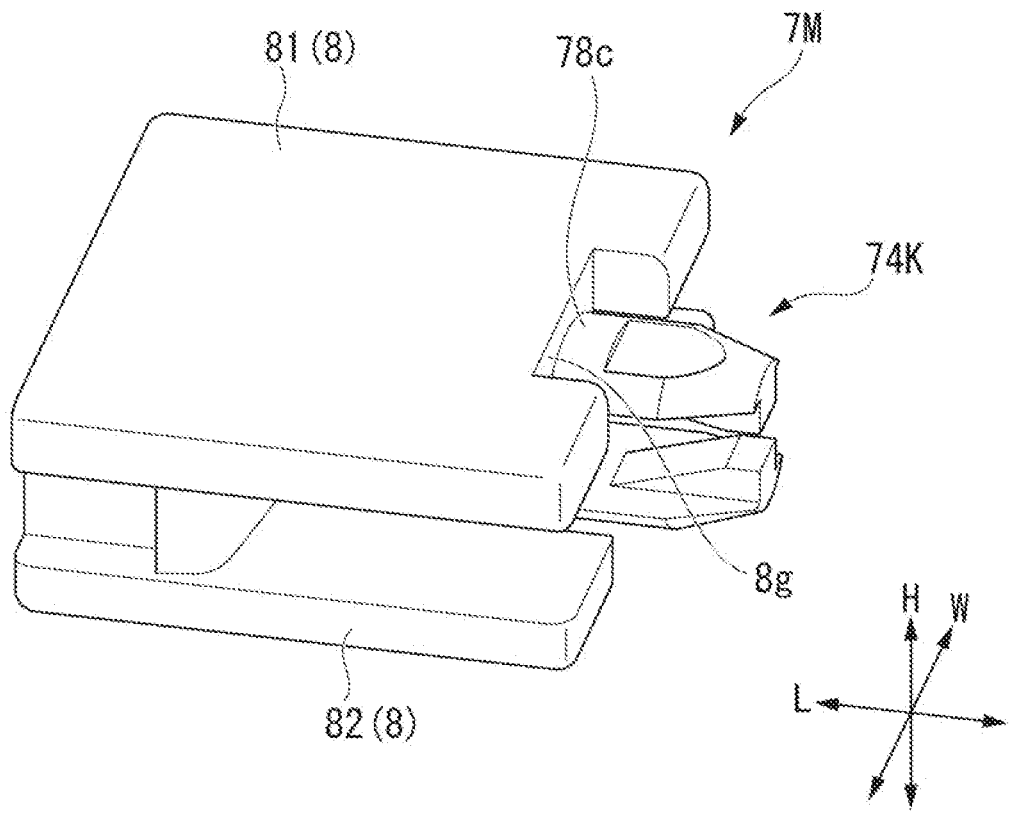
FIG. 58 is a perspective view showing a modification example of the regulating member.

FIG. 58 is a perspective view of the regulating member 7M as a modification example of the regulating member 7K.

The regulating member 7M includes the intermediate layer member 70, the assistance member 8, and the pressing portion 74K. The pressing portion 74K is connected to a recessed concave portion 8g that is at the distal-end side of the proximal end of the assistance member 8. By changing the portion where the pressing portion 74K is connected to the assistance member 8, it is possible to change the length of the pressing portion 74K protruding from the assistance member 8 toward the proximal-end side.

Modification Example 9

Figure 59:
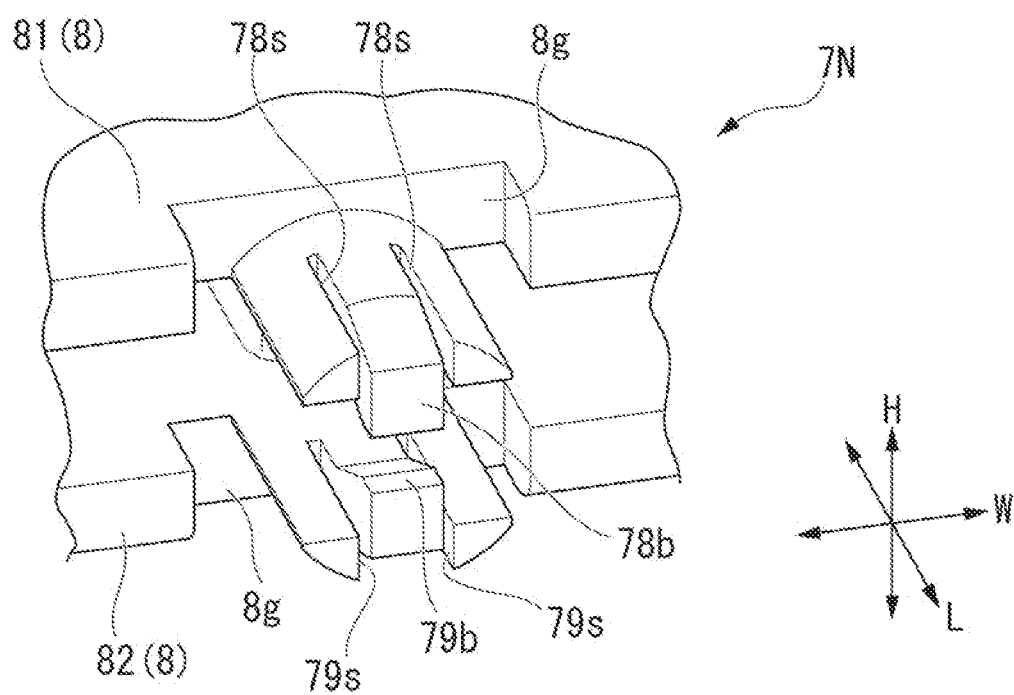
FIG. 59 is a perspective view showing another modification example of the regulating member.

FIG. 59 is a perspective view of a regulating member 7N as a modification example of the regulating member 7M.

The regulating member 7N has a slit 78s penetrating in the height direction H on both sides in the width direction W of the first convex portion 78b. Further, the regulating member 7N has a slit 79s penetrating in the height direction H on both sides in the width direction W of the second convex portion 79b. The cross-sectional area of the portion where the pair of arms 21 make the pressing portion 74K to be elastically deformed becomes small, and it is easy for the pair of arms 21 to pass therethrough.

Although embodiments and modification examples of the present disclosure have been described above in detail with reference to the drawings, the specific configuration is not limited to the embodiment, and also includes various modifications. The present disclosure is not limited to the aforementioned embodiments and modification examples, but is only limited by the appended claims.

What is claimed is:

1. A cartridge system, comprising:
   a clip unit including a clip having a plurality of arms;
   a case including an accommodation region in which the clip unit is accommodated, the accommodation region including a first region and a second region, the second region having a width larger than the first region in a width direction intersecting a longitudinal direction of the case; and
   a spacer that is accommodated in the accommodation region,
   wherein the spacer is configured to move relative to the case between the first region and the second region and be separated from the clip unit when the clip unit is moved to a proximal-end side of the case.

2. The cartridge system according to claim 1, wherein:
   the accommodation region includes the first region and the second region that are arranged along a direction from a distal end of the accommodation region toward a proximal end of the accommodation region,
   a length of the first region in the width direction orthogonal to a central axis of the accommodation region is smaller than a length of the second region in the width direction, and
   the clip unit is disposed in the accommodation region in a state in which the plurality of arms grasp the spacer when the plurality of arms are disposed in the first region.

3. The cartridge system according to claim 2, wherein:
   the clip unit is accommodated in the accommodation region such that an open-close direction of the plurality of arms coincides with the width direction orthogonal to the central axis of the accommodation region, and
   the plurality of arms grasping the spacer come into contact with the case in the open-close direction of the plurality of arms in the first region.

4. The cartridge system according to claim 2, wherein:
   the plurality of arms are configured to be separated from the spacer when the plurality of arms are disposed in the second region,
   the clip unit is accommodated in the accommodation region such that an open-close direction of the plurality of arms coincides with the width direction orthogonal to the central axis of the accommodation region,
   a length of the first region in the width direction is smaller than an opening width of an open configuration of the plurality of arms, and
   a length of the second region in the width direction is larger than the opening width of the open configuration of the plurality of arms.

5. The cartridge system according to claim 1, wherein:
   the spacer comprises:
      a protruding portion protruding in a protrusion direction orthogonal to a central axis of the spacer; and
      a tapered portion provided at a proximal-end side of the spacer, and
   a length of the tapered portion in the protrusion direction becomes smaller toward the proximal-end side of the spacer.

6. The cartridge system according to claim 1, wherein:
   the clip unit further includes a pressing tube through which the plurality of arms are inserted, and
   the spacer includes a pressing portion configured to come into contact with the pressing tube in a state in which the spacer comes into contact with the plurality of arms so as to regulate a relative movement of the spacer with respect to the pressing tube.

7. The cartridge system according to claim 6, wherein:
   the pressing portion includes a first pressing portion and a second pressing portion disposed opposite to each other in a height direction orthogonal to a central axis of the accommodation region, and
   the first pressing portion and the second pressing portion are configured to separate from each other in the height direction by coming into contact with the pulled plurality of arms.

8. The cartridge system according to claim 7, wherein:
   the first pressing portion includes a first convex portion at a second pressing portion side of the first pressing portion,
   the second pressing portion includes a second convex portion at the first pressing portion side of the second pressing portion, and
   a length between the first convex portion and the second convex portion in a height direction is smaller than a length of the plurality of arms in the height direction.

9. The cartridge system according to claim 7, wherein:
   the first pressing portion includes a first tapered surface in contact with the pressing tube at the proximal-end side, and
   the second pressing portion includes a second tapered surface in contact with the pressing tube at the proximal-end side.

10. The cartridge system according to claim 7, wherein the first pressing portion and the second pressing portion in contact with the pulled plurality of arms separate from each other in the height direction by an elastic deformation.

11. The cartridge system according to claim 6, wherein the spacer comprises:
   a protruding portion configured to protrude in a protruding direction orthogonal to a central axis of the spacer;
   the pressing portion configured to regulate a minimum approaching distance between the clip and the pressing tube; and
   a fastener configured to detachably connect the protruding portion and the pressing portion.

12. The cartridge system according to claim 1, wherein:
   the clip unit further includes a pressing tube through which the plurality of arms are inserted,
   the pressing tube includes a protruding-recessing wing configured to protrude from and recess with respect to an outer circumferential surface of the pressing tube,
   the accommodation region includes:
      a sheath connecting portion into which a sheath is insertable; and
      a folding portion communicating with the sheath connection portion and configured to make the protruding-recessing wing to recess with respect to the outer circumferential surface, and when the clip unit is pulled toward the proximal-end side such that the pressing tube passes through the folding portion, the spacer is in a state of coming into contact with the plurality of arms, and the contact with the plurality of arms is released by further pulling the clip unit toward the proximal-end side, the accommodation region includes the first region and the second region that are arranged along a direction from a distal end of the accommodation region toward a proximal end of the accommodation region, a length of the first region in the width direction orthogonal to a central axis of the accommodation region is smaller than a length of the second region in the width direction, and when the pressing tube passes through the folding portion, the spacer is disposed at the first region in a state of being grasped by the plurality of arms.

13. The cartridge system according to claim 1, further comprising a clamp, wherein:

the accommodation region includes the first region and the second region that are arranged along a direction from a distal end of the accommodation region toward a proximal end of the accommodation region, a length of the first region in the width direction orthogonal to a central axis of the accommodation region is smaller than a length of the second region in the width direction, the clip unit is accommodated in the first region in a state in which the plurality of arms are configured to grasp the spacer and are clamped by the clamp, and the clamp is in contact with the case in an open-close direction of the plurality of arms in the first region.

14. The cartridge system according to claim 1, wherein:

the spacer is formed in a rectangular box shape in which an internal space is formed along a central axis of the spacer, the internal space is a space that can accommodate distal end portions of the plurality of arms in a closed configuration, and the spacer comes into contact with the case in an open-close direction of the plurality of arms.

15. The cartridge system according to claim 1, wherein the spacer is configured to move together with the clip unit in the first region.

16. The cartridge system according to claim 15, wherein the spacer is configured to separate from the clip unit in the second region.

* * * * *